United States Patent
Wu et al.

(10) Patent No.: US 9,354,363 B2
(45) Date of Patent: May 31, 2016

(54) CONTROLLING PHASE RESPONSE IN A SUB-WAVELENGTH GRATING LENS

(75) Inventors: Wei Wu, Palo Alto, CA (US); R. Stanley Williams, Portola Valley, CA (US); Jingjing Li, Palo Alto, CA (US); Theodore I. Kamins, Palo Alto, CA (US); Marco Fiorentino, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 780 days.

(21) Appl. No.: 13/640,348

(22) PCT Filed: Apr. 13, 2010

(86) PCT No.: PCT/US2010/030832
§ 371 (c)(1),
(2), (4) Date: Oct. 10, 2012

(87) PCT Pub. No.: WO2011/129814
PCT Pub. Date: Oct. 20, 2011

(65) Prior Publication Data
US 2013/0027776 A1    Jan. 31, 2013

(51) Int. Cl.
*G02B 5/18* (2006.01)
*B05D 5/06* (2006.01)

(52) U.S. Cl.
CPC .............. *G02B 5/1809* (2013.01); *B05D 5/06* (2013.01); *G02B 5/18* (2013.01); *G02B 5/1828* (2013.01); *G02B 5/1861* (2013.01)

(58) Field of Classification Search
CPC ...... G02B 5/18; G02B 5/1809; G02B 5/1828; G02B 5/1861; B05D 3/10

USPC .......................... 359/558, 572, 573, 575, 576
See application file for complete search history.

(56) References Cited

U.S. PATENT DOCUMENTS

| 4,484,797 | A  | * | 11/1984 | Knop et al. | ............... | 359/568 |
| 5,561,558 | A  | * | 10/1996 | Shiono et al. | ............. | 359/569 |
| 6,404,553 | B1 | * | 6/2002  | Wootton | ............... | G02B 5/32 |
|           |    |   |         |         |                | 349/201   |
| 6,650,477 | B2 |   | 11/2003 | Nakai   |                |           |
| 6,707,518 | B1 |   | 3/2004  | Cowan   |                |           |

(Continued)

OTHER PUBLICATIONS

Journal of Vaccum Science and Technology. B, vol. 17, Issue 6, Dec. 19, 1999, American Vacuum Society, Berseth, C. A, et ai, 'Vertical cavity surface emitting lasers incorporating structured mirrors patterned by electron-beam ilithography', p. 3222-p. 3225.

(Continued)

*Primary Examiner* — Bumsuk Won
*Assistant Examiner* — William R Alexander
(74) *Attorney, Agent, or Firm* — Hewlett Packard Enterprise Patent Department

(57) ABSTRACT

A sub-wavelength grating device having controlled phase response includes a grating layer having line widths, line thicknesses, line periods, and line spacings selected to produce a first level of control in phase changes of different portions of a beam of light reflected from the grating layer. The device also includes a substrate affixed to the grating layer that produces a second level of control in phase changes of different portions of a beam of light reflected from the grating layer, the second level of control being accomplished abrupt stepping of the substrate in a horizontal dimension, ramping the substrate in a horizontal dimension, or changing the index of refraction in a horizontal dimension.

9 Claims, 25 Drawing Sheets

(56) References Cited

U.S. PATENT DOCUMENTS

| | | | |
|---|---|---|---|
| 6,707,608 B1* | 3/2004 | Arieli | G02B 5/1857 359/569 |
| 7,303,841 B2 | 12/2007 | Lu et al. | |
| 7,304,781 B2 | 12/2007 | Chang-Hasnain et al. | |
| 7,692,129 B2 | 4/2010 | Toshikiyo et al. | |
| 2001/0026399 A1* | 10/2001 | Nakabayashi | G02B 5/1857 359/576 |
| 2001/0051020 A1* | 12/2001 | Kashyap | G02B 6/02085 385/37 |
| 2006/0119944 A1 | 6/2006 | Yu | |
| 2007/0103782 A1* | 5/2007 | Lee | G02B 5/1809 359/565 |
| 2007/0242715 A1 | 10/2007 | Gustavsson et al. | |
| 2008/0112053 A1* | 5/2008 | Levner | G02B 6/02085 359/569 |

OTHER PUBLICATIONS

Mait, Joseph, et al. "Binary Subwavelength Diffractive-Lens Design", Optics Letters, Sep. 1, 1998, vol. 23, No., 17, pp. 1343-1345.

Mirotznik, Mark, et al., "Design of Diffractive Elements at Millimeter Wavelengths Using Subwavelength Cylindrical Microstructures", Microwave and Optical Technology Letters, Aug. 2007, vol. 49, No. 8, pp. 1880-1884.

PCT International Search Report, Dec. 28, 2010, PCT/US2010/030832, HPDC, Filed Apr. 13, 2010.

* cited by examiner

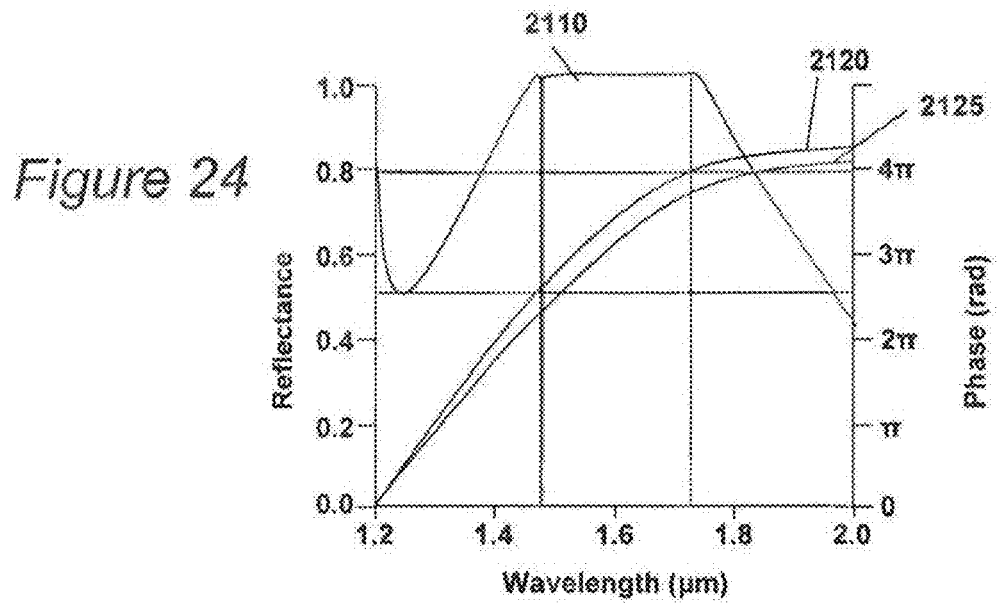
Figure 24
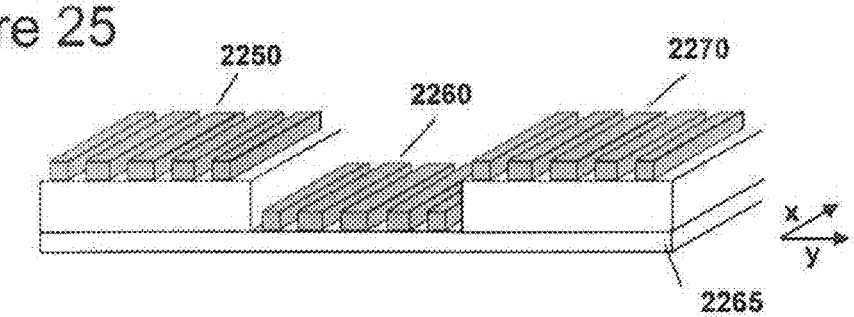
Figure 25
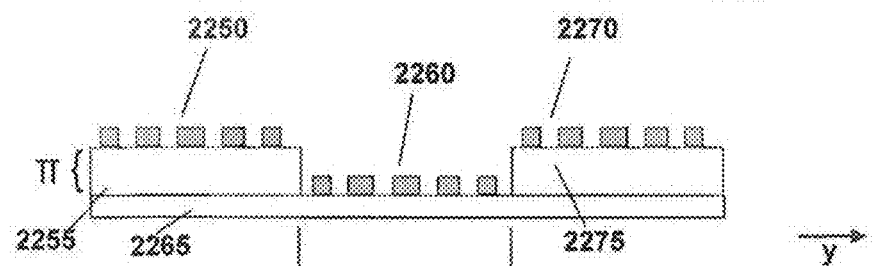
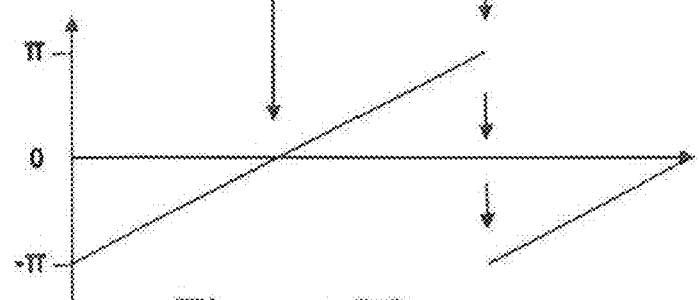
Figure 26

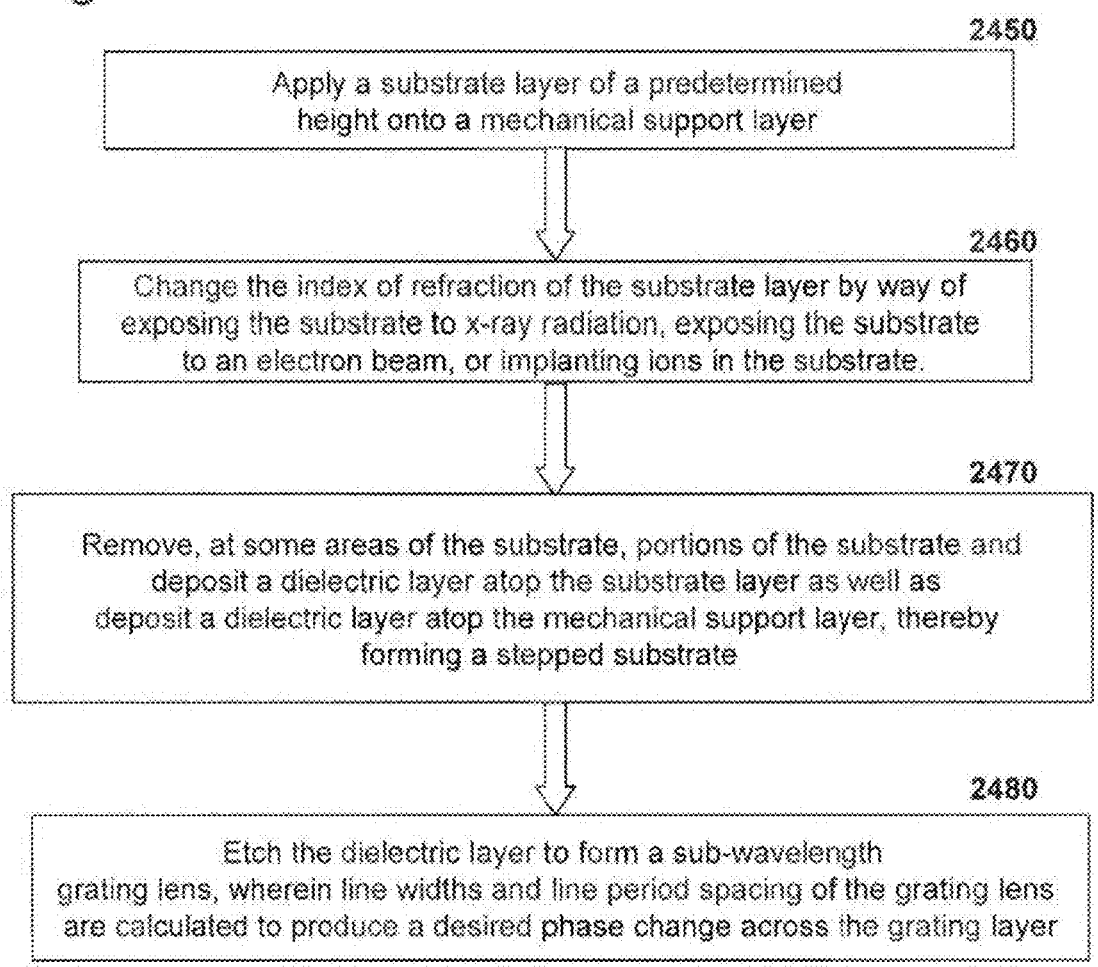

CONTROLLING PHASE RESPONSE IN A SUB-WAVELENGTH GRATING LENS

BACKGROUND

Resonant effects in dielectric gratings were identified in the early 1990's as having promising applications to free-space optical filtering and sensing. Resonant effects typically occur in sub-wavelength gratings, where the first-order diffracted mode corresponds not to freely propagating light but to a guided wave trapped within a dielectric layer. The trapped wave is re-scattered in the $0^{th}$ diffracted order and interfaces with the incident light to create a pronounced modulation of transmission and reflection. When a high-index-contrast grating is used, the guided waves are rapidly scattered and do not propagate very far laterally. As a result, the resonant feature can be considerably broadband and of high angular tolerance, which has been used to design novel types of highly reflective mirrors. Recently, sub-wavelength grating mirrors have been used to replace the top dielectric stacks in vertical-cavity surface-emitting lasers, and in novel micro-electromechanical devices. In addition to being more compact and relatively cheaper to fabricate, sub-wavelength grating mirrors also provide polarization control.

However, when designing sub-wavelength diffraction grating devices operating in a reflective mode, especially when a high degree of reflectivity is desired, the phase response of the reflective device may be difficult to control. Thus, although the device may possess the desired reflectivity, the inability to achieve the desired phase response can cause the performance of the device to suffer. In one example, a reflective device may exhibit high reflectivity of light arriving near the axis of the device but may not be able to focus light received over wide angles. In such an instance, only a small amount of light arriving from oblique angles can be directed to the focal point of the device.

BRIEF DESCRIPTION OF THE DRAWINGS

FIG. 24 shows the reflectance and phase response of the sub-wavelength grating device of FIG. 23 as a function of the wavelength of the incident light according to an embodiment of the invention.

FIG. 25 is a perspective view of a portion of a sub-wavelength grating layer of a sub-wavelength grating device according to an embodiment of the invention.

FIG. 26 is an end-on view of a portion of a grating layer of a sub-wavelength grating device according to an embodiment of the invention.

FIG. 31 is a method for fabricating a sub-wavelength grating device according to an embodiment of the invention.

DESCRIPTION OF THE EMBODIMENTS

Many embodiments of the invention are directed to planar sub-wavelength dielectric gratings that can be configured to operate as mirrors and other optical devices. The gratings are composed of two layers. The grating layer can be disposed on the surface of a substrate with the grating layer composed of a relatively higher refractive index material than the substrate, or the grating layer can simply be fabricated in on to a mechanical support layer that does not include a substrate. Sub-wavelength dielectric gratings configured in accordance with embodiments of the invention provide new functionalities including at least some amount of phase front control. This can be accomplished by configuring the grating layer with a grating pattern to control phase changes in the light reflected from the sub-wavelength dielectric grating. In certain embodiments, the grating layer can be configured so that the sub-wavelength dielectric grating can be operated as any type of optical device with an arbitrary reflecting surface. In particular, the grating layer can be configured with a grating pattern enabling the sub-wavelength dielectric grating to be operated as a cylindrical mirror or a spherical mirror.

Embodiments of the invention include measures for exercising additional control of the phase response in a sub-wavelength grating which enhance the performance of optical devices based on sub-wavelength dielectric gratings. These embodiments allow an optical device designer to select a substrate design that provides much greater flexibility over the phase of the wavefront of the reflected light. Thus, when the designer has selected a grating layer having line widths, line thicknesses, and line spacing that approach the desired reflectivity (as described herein) the designer can then select a substrate to bring about additional control over the phase of the reflected light. By way of tight control over the phase of the reflected light, the efficiency of the sub-wavelength grating device can be improved. This enhancement becomes especially useful in focusing light arriving at oblique angles as well as allowing the device to operate over a wider spectrum of wavelengths than was previously possible.

I. Planar Sub-Wavelength Dielectric Gratings

Figure 1:
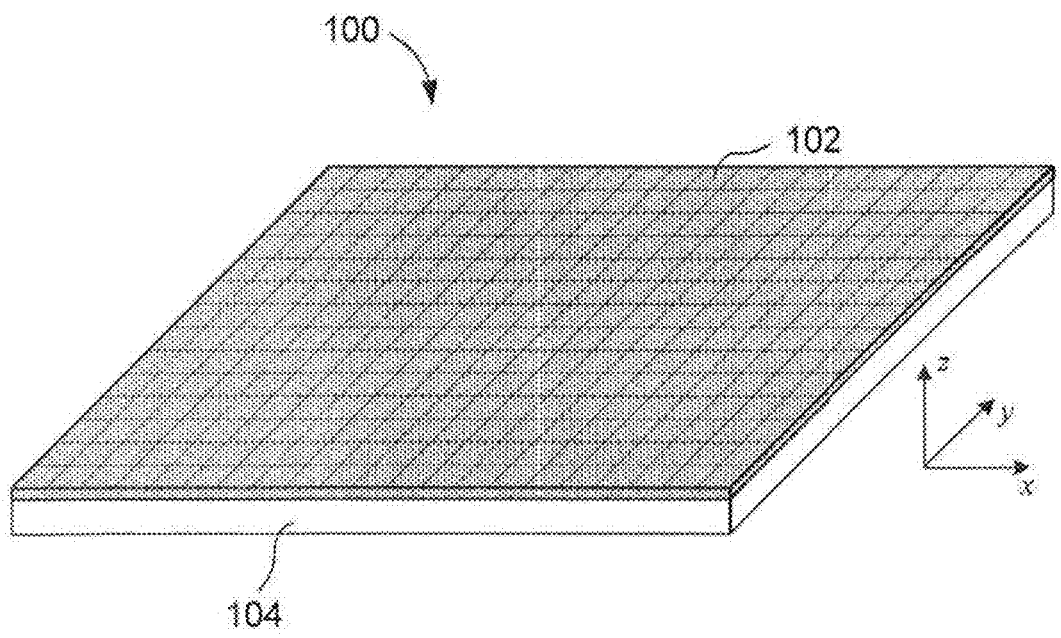
FIG. 1 shows an isometric view of a sub-wavelength grating configured according to an embodiment of the invention.

FIG. 1 shows an isometric view of sub-wavelength grating 100. Sub-wavelength grating 100 includes grating layer 102 disposed on surface of a substrate 104, where grating layer 102 is composed of a relatively higher refractive index material than substrate 104. For example, grating layer 102 can be composed of silicon ("Si") and substrate 104 can be composed of quartz or silicon dioxide ("SiO$_2$"), or grating layer 102 can be composed of gallium arsenide ("GaAs") and substrate 104 can be composed of aluminum gallium arsenide ("AlGaAs") or aluminum oxide ("Al$_2$O$_3$"). As shown in the example of FIG. 1, sub-wavelength grating 100 has a planar geometry, but grating layer 102 can be configured with a particular grating pattern enabling sub-wavelength grating 100 to be operated in the same manner as other optical devices, such as focusing and diverging cylindrical or spherical mirrors. In other embodiments, the substrate can be eliminated by forming grating layer 102 in a single membrane comprising Si, GaAs, indium phosphide ("InP"), or another suitable material.

Figure 2:
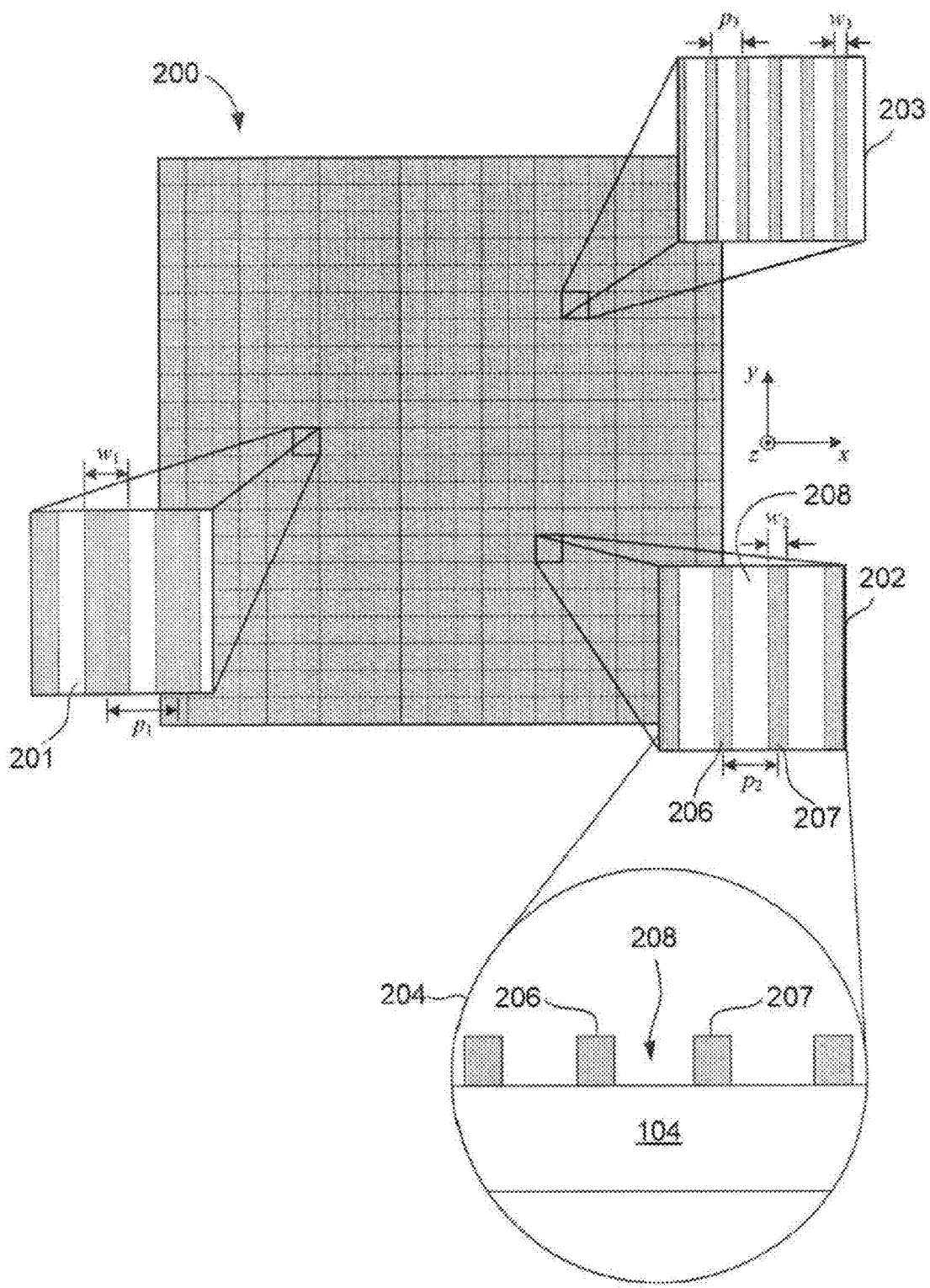
FIG. 2 shows a top plan view of a grating layer of a sub-wavelength grating configured with a one-dimensional grating pattern according to an embodiment of the invention.

Particular reflectance properties of sub-wavelength grating 100 are determined by the grating pattern selected for grating layer 102. FIG. 2 shows a top plan view of a grating layer of sub-wavelength grating 200 configured with a one-dimensional grating pattern in accordance with embodiments of the invention. The one-dimensional grating pattern is composed of a number of one-dimensional grating sub-patterns. In the example of FIG. 2, three exemplary grating sub-patterns 201-203 are enlarged. Each grating sub-pattern includes a number of regularly spaced wire-like portions of grating layer 102 material called "lines" disposed on the surface of substrate 104. The lines extend in the y-direction and are periodically spaced in the x-direction. FIG. 2 also includes an enlarged end-on view 204 of grating sub-pattern 202. Shaded rectangles 206 and 207 represent lines composed of a relatively higher index material than substrate 104. Lines 206 and 207 are separated by groove 208 extending in the z-direction and exposing the surface of substrate 104. Each sub-pattern is characterized by a particular periodic spacing of the lines and by the line width in the x-direction. For example, sub-pattern 201 comprises lines of width $w_1$ separated by a period $p_1$, sub-pattern 202 comprises lines with width $w_2$ separated by a period $p_2$, and sub-pattern 203 comprises lines with width $w_3$ separated by a period $p_3$.

Grating sub-patterns 201-203 form sub-wavelength gratings that preferentially reflect incident light polarized in one direction, e.g. the x direction, provided the periods $p_1$, $p_2$, and $p_3$ are smaller than the wavelength of the incident light. For example, the lines widths can range from approximately 10 nm to approximately 300 nm and the periods can range from approximately 20 nm to approximately 1 µm depending on the wavelength of the incident light. The light reflected from a region acquires a phase ($\phi$) determined by the line thickness t, and the duty cycle η determined by:

$$\eta = \frac{w}{p}$$

In which "w" is the line width and "p" is the period of the lines associated with the region.

Note that sub-wavelength grating 200 can be configured to reflect the x-polarized component or the y-polarized component of the incident light by adjusting the period, line width, and line thickness of the lines. For example, a particular period, line width and line thickness may be suitable for reflecting the x-polarized component but not for reflecting the y-polarized component; and a different period, line width and line thickness may be suitable for reflecting y-polarized component but not for reflecting the x-polarized component.

Figure 3:
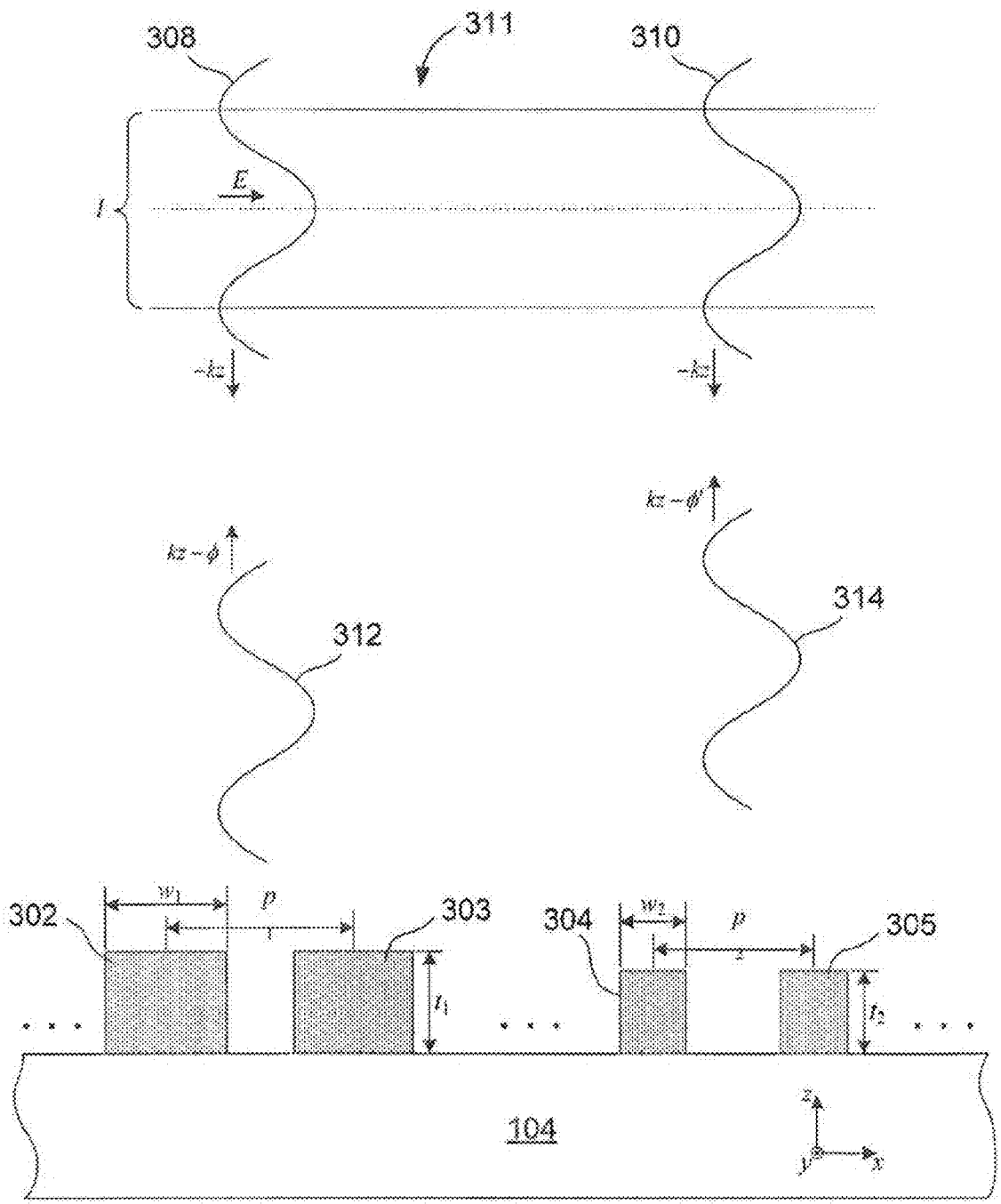
FIG. 3 shows a cross-sectional view of lines from two separate grating sub-patterns revealing the phase acquired by reflected light according to an embodiment of the invention.

Each of grating sub-patterns 201-203 also reflects incident light polarized in one direction, say the x-direction, differently due to the different duty cycles and periods associated with each of the sub-patterns. FIG. 3 shows a cross-sectional view of lines from two separate grating sub-patterns revealing the phase acquired by reflected light in accordance with embodiments of the invention. For example, lines 302 and 303 can be lines in a first sub-pattern and lines 304 and 305 can be lines in a second sub-pattern located elsewhere on substrate 104. Thickness $t_1$ of lines 302 and 303 is greater than thickness $t_2$ of lines 304 and 305, and duty cycle $\eta_1$ associated with lines 302 and 303 is also greater than duty cycle $\eta_2$ associated with lines 304 and 305. Light polarized in the x-direction and incident on lines 302-305 becomes trapped by lines 302 and 303 for a relatively longer period of time than the portion of the incident light trapped by lines 304 and 305. As a result, the portion of light reflected from lines 302 and 303 acquires a larger phase shift than the portion of light reflected from lines 304 and 305. As shown in FIG. 3, incident waves 308 and 310 strike lines 302-305 with approximately the same phase, but wave 312 reflected from lines 302 and 303 acquires a relatively larger phase shift $\phi$ than phase $\phi'$ ($\phi > \phi'$) acquired by wave 314 reflected from lines 304 and 305.

Figure 4:
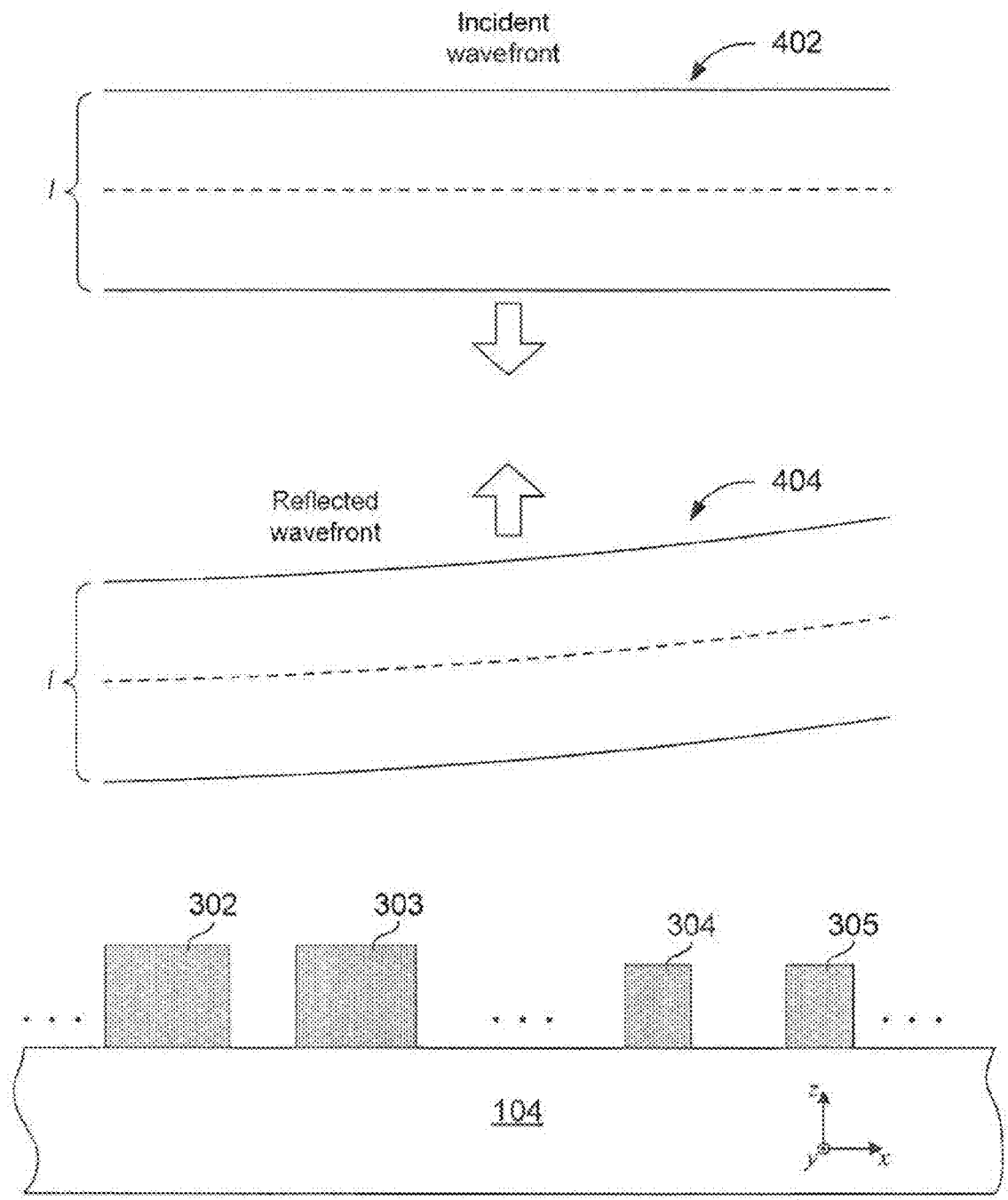
FIG. 4 shows a cross-sectional view of lines from two separate grating sub-patterns revealing how the wavefront changes according to an embodiment of the invention.

FIG. 4 shows a cross-sectional view of lines 302-305 revealing how the wavefront changes in accordance with embodiments of the invention. As shown in the example of FIG. 4, incident light with substantially uniform wavefront 402 strikes lines 302-305 and second surface 104 producing reflected light with a curved reflected wavefront 404. The curved reflected wavefront 404 results from portions of incident wavefront 402 interacting with lines 302 and 303 with a relatively larger duty cycle $\eta_1$ and thickness $t_1$ than portions of incident wavefront 402 interacting with lines 304 and 305 with a relatively smaller duty cycle $\eta_2$ and thickness $t_2$. The shape of reflected wavefront 404 is consistent with the larger phase acquired by light striking lines 302 and 303 relative to the smaller phase acquired by light striking lines 304 and 305.

Sub-wavelength gratings 200 can be configured to apply some level of phase change to reflected light while maintaining a high reflectivity. In particular, a sub-wavelength grating configured with a one-dimensional grating pattern can apply a phase change to reflected light polarized perpendicular to the lines, as described above with reference to FIGS. 2-4.

Figure 5:
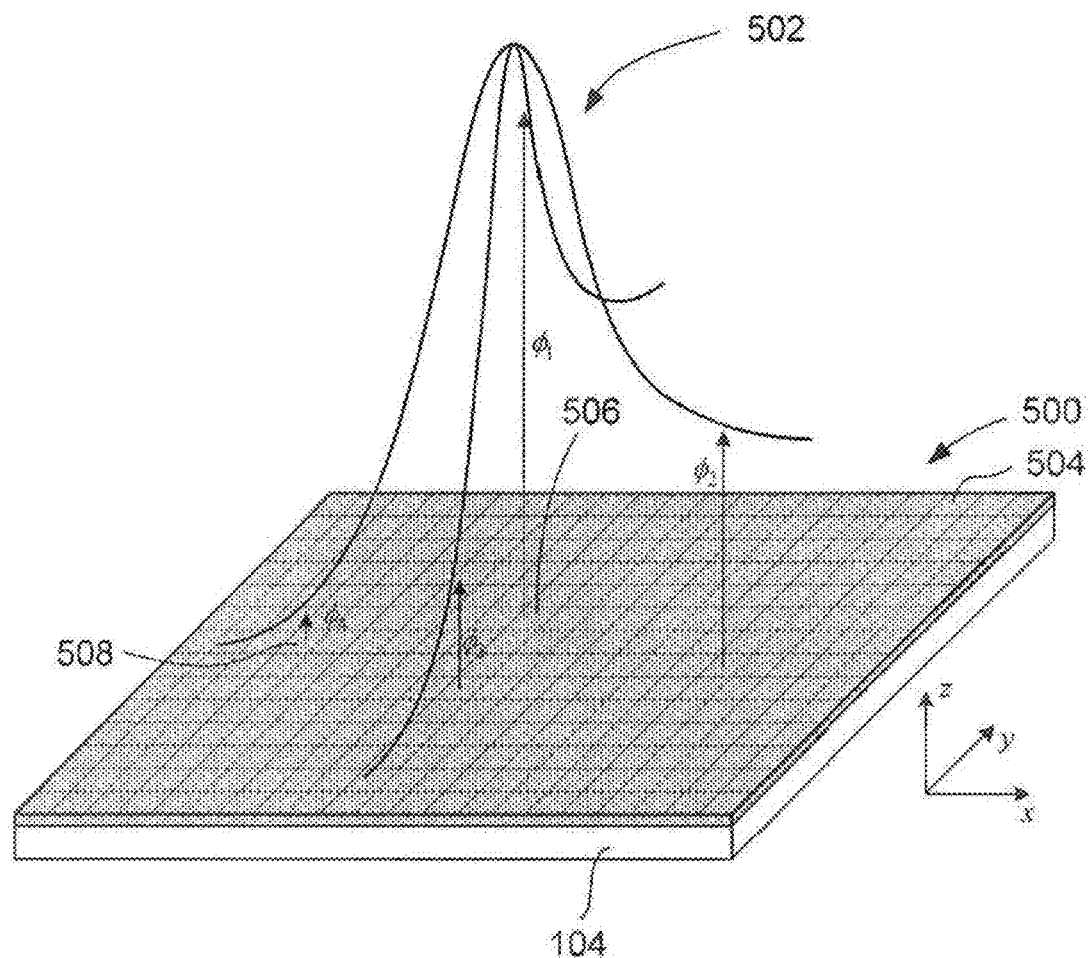
FIG. 5 shows an isometric view of an exemplary phase change contour map produced by a grating pattern configured according to an embodiment of the invention.

FIG. 5 shows an isometric view of exemplary phase change contour map 502 produced by a particular grating pattern of grating layer 504 in accordance with embodiments of the invention. Contour map 502 represents the magnitude of the phase change acquired by light reflected from sub wavelength grating 500. In the example shown in FIG. 5, the grating pattern in grating layer 504 produces a tilted Gaussian-shaped phase contour map 502 with the largest magnitude in the phase acquired by the light reflected near the center of grating layer 504. The magnitude of the phase acquired by reflected light decreases away from the center of grating layer 504. For example, light reflected from sub-pattern 506 acquires a phase of $\phi_1$, and light reflected from sub-pattern 508 acquires a phase of $\phi_2$. Because $\phi_1$ is much larger than $\phi_2$, the light reflected from sub-pattern 506 acquires a much larger phase than the light reflected from sub-pattern 508.

The phase change, in turn, shapes the wavefront of light reflected from the sub-wavelength grating. For example, as described in reference to FIG. 3, lines having a relatively larger duty cycle produce a larger phase shift in reflected light than lines having a relatively smaller duty cycle. (However, as will be described later in, there are limits to the amount of control that can be exercised over the phase shift brought about by gratings such as that described in FIG. 3.) As a result of the phase shift, a first portion of a wavefront reflected from lines having a first duty cycle lags behind a second portion of the same wavefront reflected from a different set of lines configured with a second relatively smaller duty cycle. Embodiments of the invention include patterning the grating layer of a sub-wavelength grating to exercise at least to some amount control the phase change and ultimately the reflected wavefront so that the sub-wavelength grating can be operated as an optical device with particular optical properties, such as a focusing mirror or a diverging mirror.

Figure 6B:
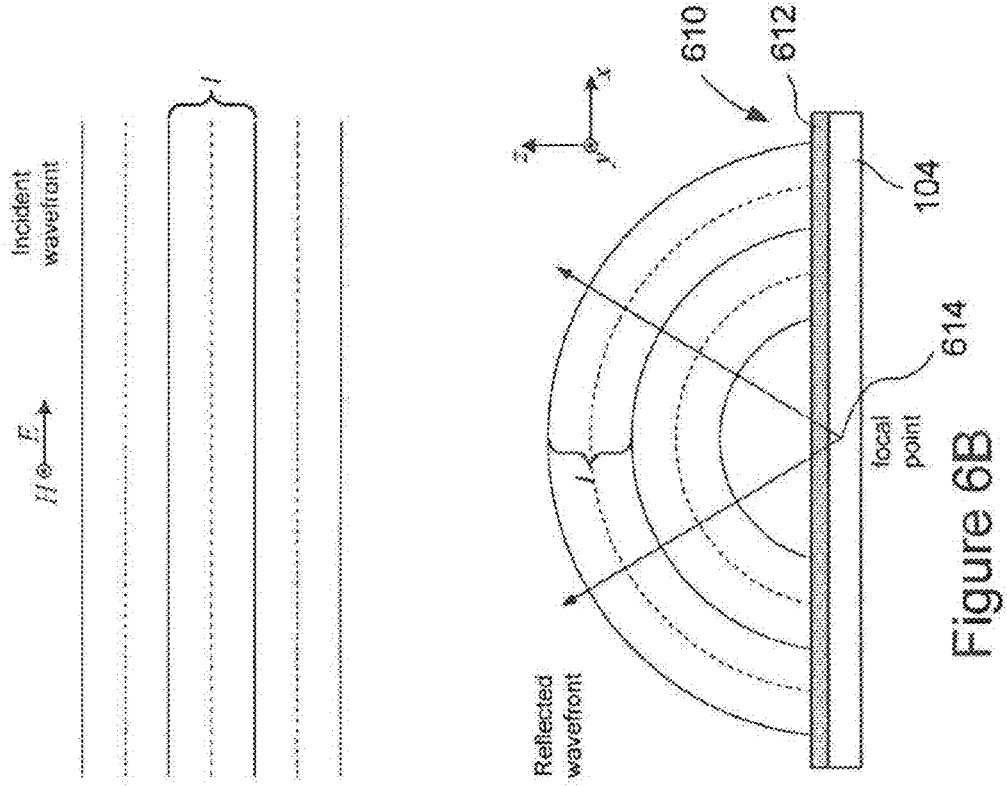
FIG. 6B shows a side view of a sub-wavelength grating configured and operated as a diverging mirror according to an embodiment of the invention.
Figure 6A:
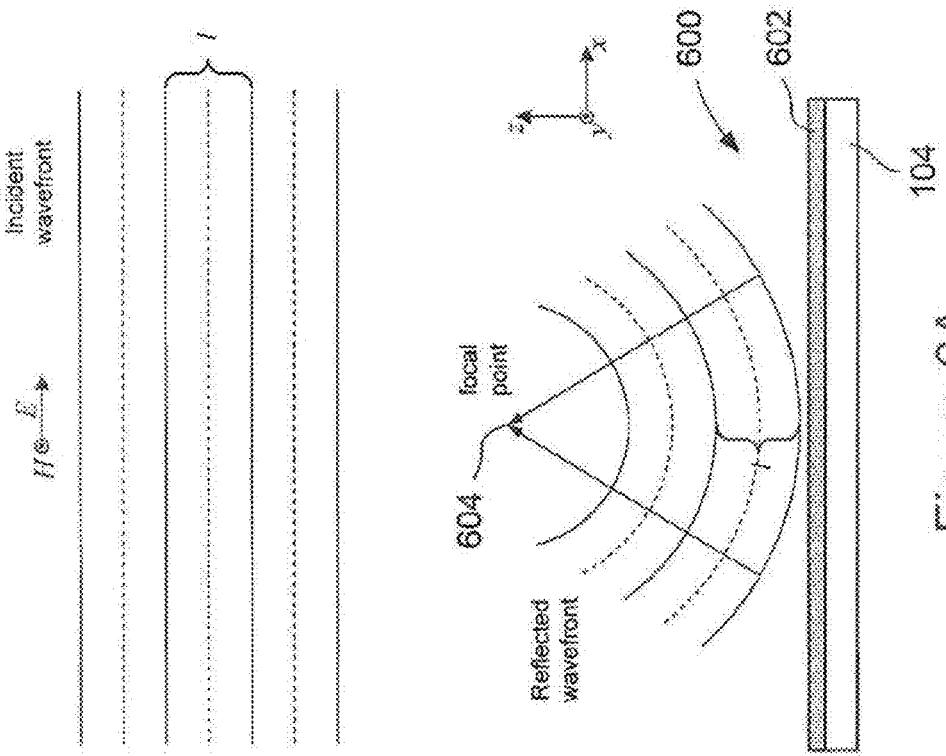
FIG. 6A shows a side view of a sub-wavelength grating configured to focus incident light to a focal point according to an embodiment of the invention.

FIG. 6A shows a side view of sub-wavelength grating 600 with grating layer 602 configured to focus incident light to focal point 604 in accordance with embodiments of the invention. In the example of FIG. 6A, grating layer 602 is configured with a grating pattern so that incident light polarized in the x-direction is reflected with a wavefront corresponding to focusing the reflected light at focal point 604. On the other hand, FIG. 6B shows a side view of sub-wavelength grating 610 configured and operated as a diverging mirror in accordance with embodiments of the invention. In the example of FIG. 6B, grating layer 612 is configured with a grating pattern so that incident light polarized in the x-direction is reflected with a wavefront corresponding to light emanating from focal point 614. Embodiments directed to focusing and diverging light are described in greater detail below in a subsection herein titled Cylindrical and Spherical Mirrors.

II. Designing Sub-Wavelength Gratings

Figure 7:
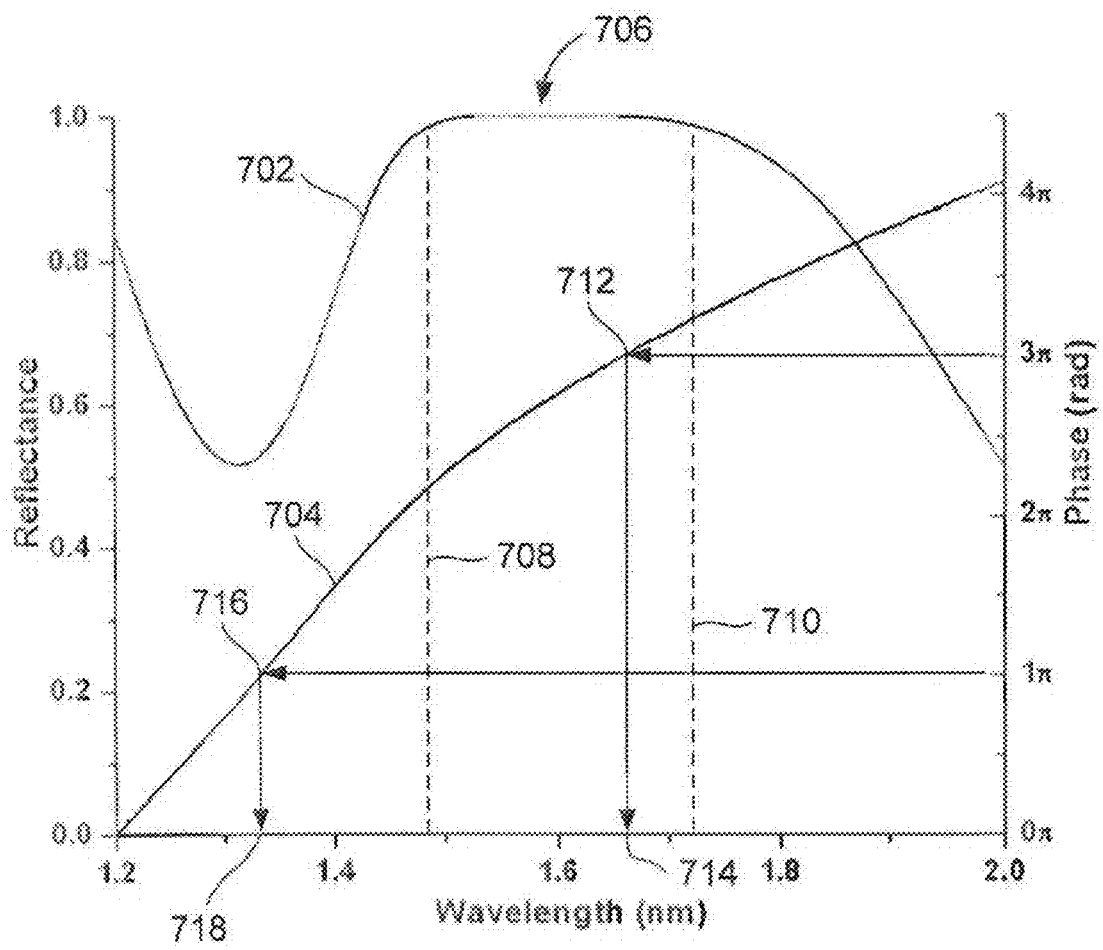
FIG. 7 shows a plot of reflectance and phase shift over a range of incident light wavelengths for a sub-wavelength grating configured according to an embodiment of the invention.

Embodiments of the invention include a number of ways in which a sub wavelength grating can be designed to operate as a mirror that allows at least some amount of control over the phase front of the reflected light. An example of a sub-wavelength grating designed to produce a particular phase change in reflected light is described above in FIG. 5. A first method includes determining a reflection coefficient profile for the grating layer of a sub-wavelength grating. The reflection coefficient is a complex valued function represented by:

$$r(\lambda) = \sqrt{R(\lambda)} e^{i\phi(\lambda)}$$

where $R(\lambda)$ is the reflectance of the grating, and $\phi(\lambda)$ is the phase shift or change produced by the grating. FIG. 7 shows a plot of reflectance and phase shift over a range of incident light wavelengths for a sub-wavelength grating comprising a Si grating layer disposed on a quartz substrate in accordance with embodiments of the invention. In this example, the grating layer is configured with a one-dimensional grating and is operated at normal incidence with the electric field polarized perpendicular to the lines comprising the grating layer. In FIG. 7, curve 702 corresponds to the reflectance $R(\lambda)$ and curve 704 corresponds to the phase shift $\phi(\lambda)$ produced by the sub-wavelength grating for the incident light over the wavelength range of approximately 1.2 µm to approximately 2.0 µm. The reflectance and phase curves 702 and 704 can be determined using either the well-known finite element method or rigorous coupled wave analysis. Due to the strong refractive index contrast between Si and air, the grating has a broad spectral region of high reflectivity 706. However, curve 704 reveals that the phase of the reflected light varies across the entire high-reflectivity spectral region between dashed-lines 708 and 710.

When the spatial dimensions of the period and width of the lines is changed uniformly by a factor $\alpha$, the reflection coefficient profile remains substantially unchanged, but with the wavelength axis scaled by the factor $\alpha$. In other words, when a grating has been designed with a particular reflection coefficient $R_0$ at a free space wavelength $\lambda_0$, a new grating with the same reflection coefficient at a different wavelength $\lambda$ can be designed by multiplying all the grating geometric parameters, such as the period, line thickness, and line width, by the factor $\alpha = \lambda/\lambda_0$, giving $$r(\lambda) = r_0(\lambda/\alpha) = r_0(\lambda_0).$$

In addition, a grating can be designed with $|R(\lambda)| \rightarrow 1$, but with a spatially varying phase, by scaling the parameters of the original periodic grating non-uniformly within the high-reflectivity spectral window 706. Suppose that introducing a phase $\phi(x,y)$ on a portion of light reflected from a point on the sub wavelength grating with transverse coordinates (x,y) is desired. Near the point (x,y), a nonuniform grating with a slowly varying grating scale factor α(x,y) behaves locally as though the grating was a periodic grating with a reflection coefficient $R_0(\lambda/\alpha)$. Thus, given a periodic grating design with a phase $\phi_0$ at some wavelength $\lambda_0$, choosing a local scale factor $\alpha(x,y)=\lambda/\lambda_0$ gives $\phi(x,y)=\phi_0$ at the operating wavelength $\lambda$. For example, suppose that introducing a phase of approximately $3\pi$ on a portion of the light reflected from a point (x,y) on a sub-wavelength grating design is desired, but the line width and period selected for point (x,y) introduces a phase of approximately $\pi$. Referring now to the plot of FIG. 7, the desired phase $\phi_0=3\pi$ corresponds to the point 712 on the curve 704 and the wavelength $\lambda_0 \approx 1.67$ μm 714, and the phase $\pi$ associated with the point (x,y) corresponds to the point 716 on the curve 704 and the wavelength $\pi \approx 1.34$ μm. Thus the scale factor is $\alpha(x,y)=\lambda/\lambda_0=1.34/1.67=0.802$, and the line width and period at the point (x,y) can be adjusted by multiplying by the factor α in order to obtain the desired phase $\phi_0=3\pi$ at operating wavelength $\lambda=1.34$ μm.

Figure 8:
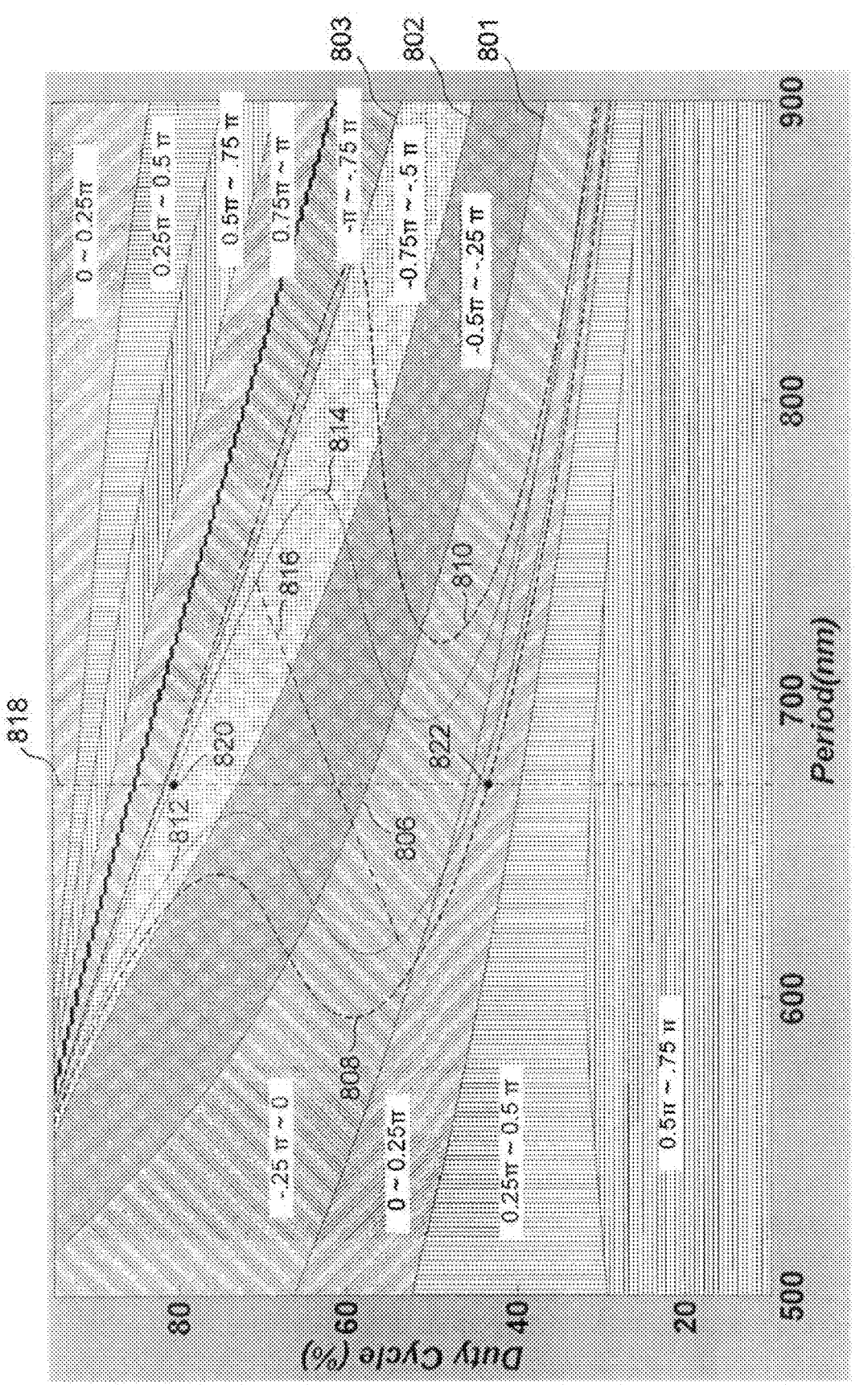
FIG. 8 shows a phase contour plot of phase variation as a function of period and duty cycle obtained according to an embodiment of the invention.

The plot of reflectance and phase shift versus a range of wavelengths shown in FIG. 7 represents one way in which parameters of a sub-wavelength grating, such as line width, line thickness and period, can be determined in order to introduce a particular phase to light reflected from a particular point of the grating. In other embodiments, phase variation as a function of period and duty cycle can also be used to construct a sub-wavelength grating. FIG. 8 shows a phase contour plot of phase variation as a function of period and duty cycle obtained in accordance with embodiments of the invention using either well-known finite element method or rigorous coupled wave analysis. Contour lines, such as contour lines 801-803, each correspond to a particular phase acquired by light reflected from a grating pattern with a period and duty cycle lying anywhere along the contour. The phase contours are separated by $0.25\pi$ rad. For example, contour 801 corresponds periods and duty cycles that apply a phase of $-0.25\pi$ rad to reflected light, and contour 802 corresponds to periods and duty cycles that apply a phase of $-0.5\pi$ rad to reflected light. Phases between $-0.25\pi$ rad and $-0.5\pi$ rad are applied to light reflected from a sub-wavelength grating with periods and duty cycles that lie between contours 801 and 802. A first point (p,η) 804, corresponding to a grating period of 700 nm and 54% duty cycle, and a second point (p,η) 806, corresponding to a grating period of 660 nm and 60% duty cycle, both of which lie along the contour 801. A grating pattern with a period and duty cycle represented by the first point 804 introduces the same phase $\phi=-0.25\pi$ rad to reflected light as a grating pattern represented by the second point 806.

FIG. 8 also includes two reflectivity contours for 95% and 98% reflectivity overlain on the phase contour surface. Dashed-line contours 808 and 810 correspond to 95% reflectivity, and solid line contours 812 and 814 correspond to 98% reflectivity. Points (p,η,φ) that lie anywhere between the contours 808 and 810 have a minimum reflectivity of 95%, and points (p,η,φ) that lie anywhere between contours 812 and 814 have a minimum reflectivity of 98%.

The points (p,η,φ) represented by the phase contour plot can be used to select periods and duty cycles for a grating that can be operated as a particular type of mirror with a minimum reflectivity, as described below in the next subsection. In other words, the data represented in the phase contour plot of FIG. 8 can be used to design sub-wavelength grating optical devices. In certain embodiments, the period or duty cycle can be fixed while the other parameter is varied to design and fabricate sub-wavelength gratings. In other embodiments, both the period and duty cycle can be varied to design and fabricate sub-wavelength gratings.

III. Methods for Fabricating Sub-Wavelength Dielectric Gratings

Embodiments of the invention include a general method for designing a grating to operate as a mirror in which light is reflected or as a lens in which light is transmitted through the device where the period and the duty cycle can vary by selecting a continuous phase distribution oriented in any suitable direction inside a selected reflectivity region of the phase contour surface shown in FIG. 8. For example, dashed line 816 represents a selected phase distribution φ for a sub-wavelength grating mirror overlain on the phase contour surface within the region of 98% minimum reflectivity. The variable period and duty cycle can determined as follows:

Consider a selected target phase distribution $\phi=\Psi(x)$ along a continuous curve inside a desired reflectivity region of the phase contour surface, such as the curve represented by line 816 of FIG. 8. The line representing the phase distribution $\phi=\Psi(x)$ can also be described as a one-dimensional parametric function $\phi=\Phi(t)$ with corresponding parametric functions of the parameter t representing the period $p=P(t)$ and duty cycle $\eta=H(t)$. In other words, any point on the target phase distribution $\phi=\Psi(x)$ can be related to a parameter t and a corresponding phase described by $\phi=\Phi(t)$, while the corresponding period and duty cycle are represented by the linear functions $p=P(t)$ and $\eta=H(t)$. For example, $\Phi(t)$ can be determined by matching $\phi=\Psi(x)$ to points along a curve of the phase contour surface between desired minimum reflectivity contours, such as the curve represented by line 816 in FIG. 8. Projecting the curve onto the pη-plane produces a line that can be characterized by parametric equations P(t) and H(t). The phase at the center of the device is determined by $\phi_0=\Psi(x_0=0)$. By solving $\Phi(t)=\Psi(x=0)$ for the value of $t=t_0$. The period and duty cycle for the line centered at position x=0 are $p_0=P(t_0)$ and $\eta_0=H(t_0)$. The center of the device and duty cycles are found one-by-one following an iteration process described as follows:

Suppose the center position for period number n is $x_n$ with period value $p_n$. The center position of the next period can be determined by:

$$x_{n+1} = x_n + \frac{p_n}{2} + \frac{p_{n+1}}{2} \qquad \text{Equation (1)}$$

where $x_n$ and $p_n$ are known values and $p_{n+1}$ is to be determined. The phase at position $x_{n+1}$ can be determined by the line $\Phi(t)$ at $t=t_{n+1}$, where $t_{n+1}$ is also a value to be determined. The phase at $x_{n+1}$ also satisfies the selected phase distribution $\Psi(x)$. Thus $$\Psi(x_{n+1})=\Phi(t_{n+1}) \qquad \text{Equation (2):}$$

and $$p_{n+1}=P(t_{n+1}) \qquad \text{Equation (3)}$$

Inserting Equations (1) and (3) into Equation (2) gives:

$$\Psi\left(x_n + \frac{p_n}{2} + \frac{p_{n+1}}{2}\right) = \Phi(t_{n+1}) \qquad \text{Equation (4)}$$

Equation (4) is a function of only one unknown $t_{n+1}$, which can be solved numerically. After finding $t_{n+1}$, $p_{n+1}$ is found by equation (3) and $x_{n+1}$ is found by equation (1), while the duty cycle is calculated from $\eta_{n+1}=H(t_{n+1})$. The former iteration process is repeated until $x_n \geq A$ where A is the specified radius of the sub-wavelength grating device. Although it may be possible that for some give continuous lines ($\Phi(t)$, $P(t)$, $H(t)$), a solution for equation (4) may not exist. In practice, such situations should be rare.

Figure 9:
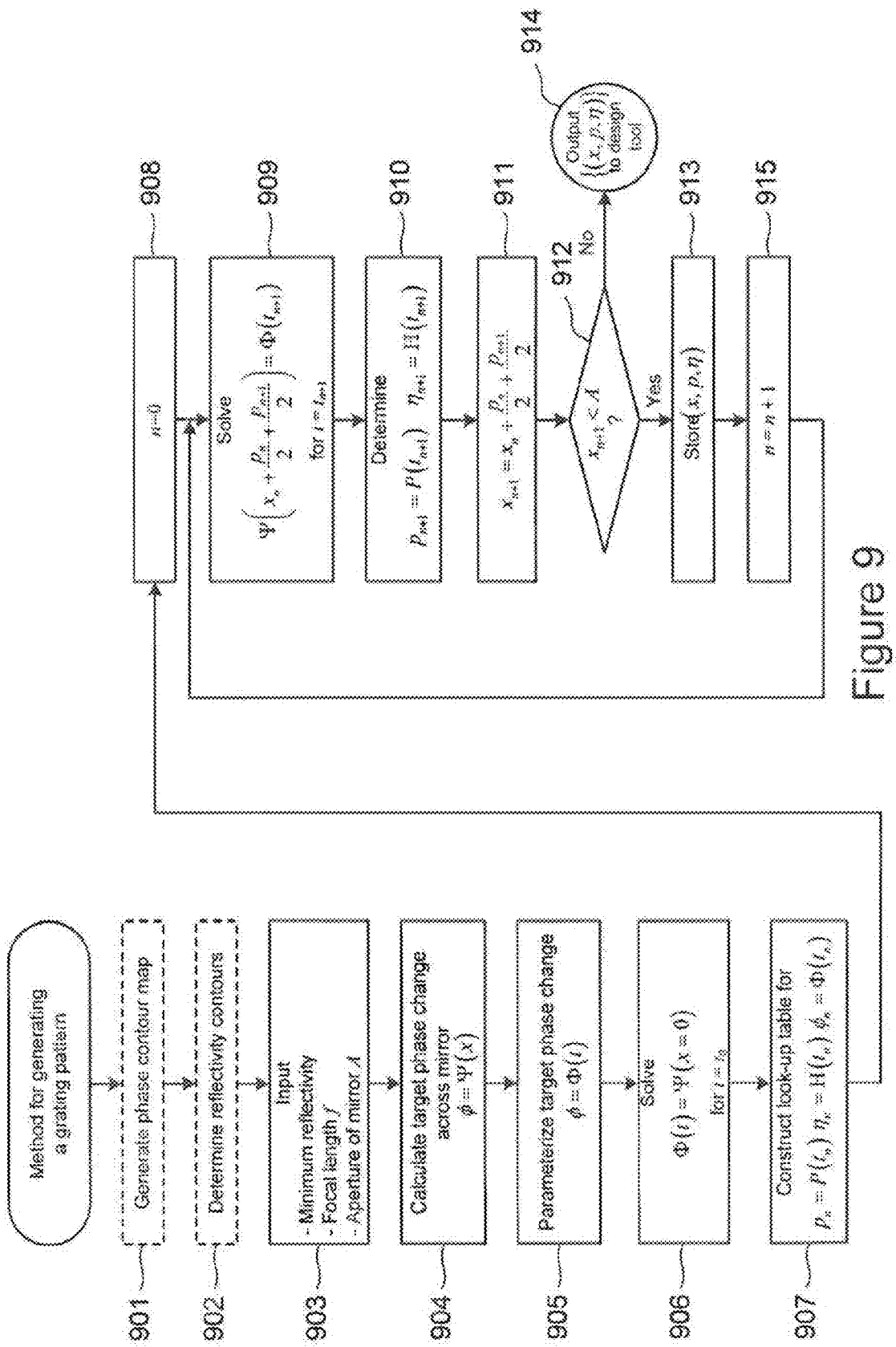
FIG. 9 shows control-flow diagram for generating a grating pattern where the period and duty cycle are allowed to vary according to an embodiment of the invention.

FIG. 9 shows a control-flow diagram for generating a grating pattern where the period and duty cycle are allowed to vary in accordance with embodiments of the invention. In step 901, a phase contour map, represented by the phase contour plot shown in FIG. 8, is calculated to determine, in general, a data set $\{(p,\eta,\phi)\}$ representing the relationship between phase, duty cycle and period of any sub-wavelength grating optical device. In step 902, reflectivity contours are determined for the phase contour map, such as the reflectivity contours 808 and 810 for the 95% reflectivity, shown in FIG. 8. The phase contour map $\{(p,\eta,\phi)\}$ and the reflectivity contour data can be stored in and retrieved from a computer-readable medium, as described in greater detail below with reference to FIG. 16. Note that steps 901 and 902 can be performed one time and the data generated by steps 901 and 902 can be used in the execution of steps 903-913 to determine focusing and non-focusing sub-wavelength grating mirrors, or used to generate a grating pattern for any other sub-wavelength grating optical device. In step 903, the minimum reflectivity, focal length, mirror radius A can be input as described above. In step 904, a selected target phase change across the mirror $\phi=\Psi(x)$ can be determined as described below with reference to FIGS. 11 and 15. In step 905, the target phase $\phi=\Psi(x)$ is matched to a continuous curve of the phase contour surface within a desired reflectivity region, such as the curve represented by line 816 of FIG. 8 for minimum 98% reflectivity. The target phase $\phi=\Phi(x)$ is parameterized to obtain a one-dimensional parametric function $\phi=\Phi(t)$. In step 906, the phase at the center of the grating device is determined by $\phi_0=\Psi(x_0=0)$. By solving $\Phi(t)=\Psi(x=0)$ for the value of $t=t_0$, the period and duty cycle for the line centered at position $x_0=0$ are given by $p_0=P(t_0)$ and $\eta_0=H(t_0)$. In step 907, a look-up table for the period $p_n=P(t_n)$, duty cycle $\eta_n=H(t_n)$, and phase $\phi_n=\Phi(t_n)$ as a function of the parameter $t_n$ is constrained. In step 908, the period number n is initialized to zero. In step 909, equation (3):

$$\Psi\left(x_n + \frac{p_n}{2} + \frac{p_{n+1}}{2}\right) = \Phi(t_{n+1})$$

is solved for $t_{n+1}$ numerically using Newton's method or another suitable numerical method for determining $t_{n+1}$. In step 910, given $t_{n+1}$, the period $p_n=P(t_n)$ and duty cycle $\eta_n=H(t_n)$ can be determined from the look-up table. In step 911, the center position of the next period can be determined by:

$$x_{n+1} = x_n + \frac{p_n}{2} + \frac{p_{n+1}}{2}$$

In step 912, when $x_{n+1}$ is less than A, proceed to step 913 where the three-tuple $(x_n,p_n,\eta_n)$ can be stored in a computer readable medium as described below. In step 914, the stored values $(x_n,p_n,\eta_n)$ can be sent to a design tool where a sub-wavelength grating with the input parameters can be fabricated. In step 915, the period number is incremented.

Figure 10A:
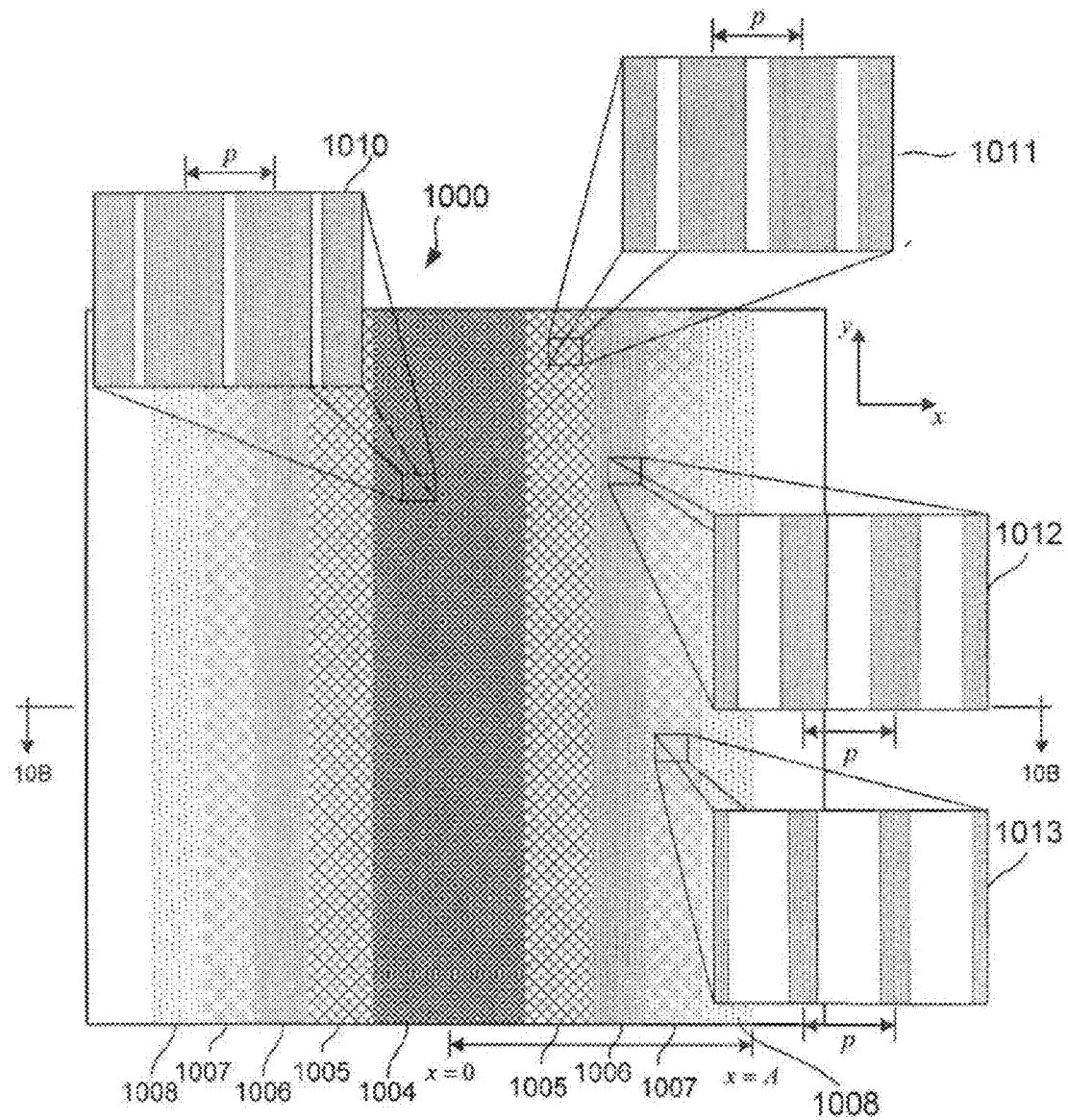
FIG. 10A shows a top plan-view of a one-dimensional sub-wavelength grating configured to operate as a focusing cylindrical mirror according to an embodiment of the invention.
Figure 10B:
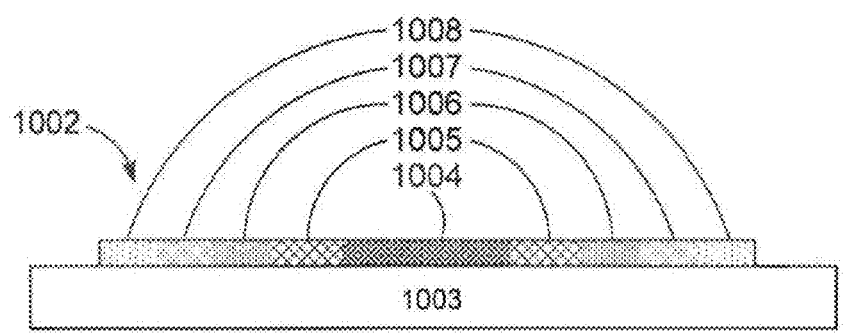
FIG. 10B shows a cross-sectional view of the sub-wavelength grating along a line 10B-10B, shown in FIG. 10A, according to an embodiment of the invention.

Now consider configuring a simple substantially planar sub-wavelength grating to operate as a cylindrical mirror. The sub-wavelength grating has a variable line width, or duty cycle, but the period is constant throughout. FIG. 10A shows a top plan-view of one-dimensional sub-wavelength grating 1000 configured to operate as a focusing cylindrical mirror for incident light polarized parallel to the x-direction in accordance with embodiments of the invention. FIG. 10B shows a cross-sectional view of sub-wavelength grating 1000 along line 10B-10B, shown in FIG. 10A, in accordance with embodiments of the invention. As shown in FIG. 10B, sub-wavelength grating 1000 comprises grating layer 1002 disposed on surface of a substrate 1003. Grating layer 1002 can be composed a material having a relatively higher refractive index than substrate 1003. Grating layer 1002 defines a mirror aperture extending the length of sub-wavelength grating 1000 in the y-direction and having length 2A in the x-direction. FIGS. 10A-10B include shaded regions 1004-1008 of grating layer 1002. Each shaded region represents a different grating sub-pattern of lines formed in grating layer 1002, with darker shaded regions, such as region 1004, representing regions with a relatively larger duty cycle than lighter shaded regions, such as region 1007. FIG. 10A also includes enlargements 1010-1013 of sub-regions of the four regions 1004-1007 revealing that the lines run parallel in the y-direction and the line period p is constant or fixed in the x-direction. Enlargements 1010-1013 also reveal that the line width w, in other words the duty cycle $\eta$, decreases away from the center. The grating layer 1002 is configured to focus reflected light polarized in the x-direction to a focal point, as described above with reference to FIG. 6A.

Prior to fabricating sub-wavelength grating cylindrical mirror 1000 shown in FIG. 10, a minimum reflectivity, focal length f, mirror aperture 2A, and preferred period range $p_{min}$ and $p_{max}$ are determined. The minimum reflectivity, focal length f, and mirror aperture 2A are constraints that may be determined by the user, based on how the sub-wavelength grating mirror 1000 is intended to be used or the type of device the sub-wavelength grating mirror 1000 is intended to be used in. For example, a user may want to employ the sub-wavelength grating mirror 1000 in a system with a preferred focal length of 15 mm and with a minimum reflectivity of 85%. In addition, the aperture may not exceed 10 mm. The preferred period range may be constrained by resolution limitations in the techniques used to fabricate the sub-wavelength grating mirror 1000.

Figure 11:
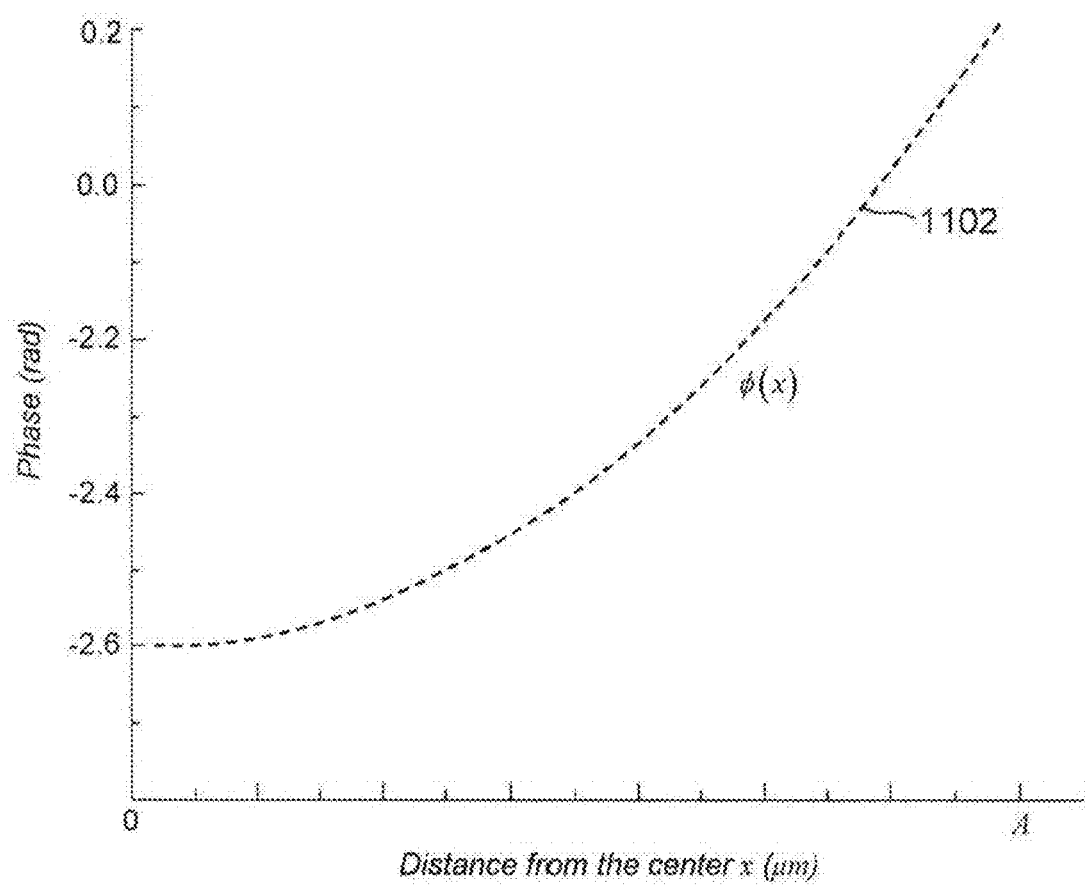
FIG. 11 shows an exemplary plot of the target phase change for a cylindrical mirror determined according to an embodiment of the invention.

Once the parameters for the sub-wavelength grating mirror have been determined, a desired or target phase change across the mirror in the x-direction can be determined. For a cylindrical focusing mirror, the target phase change across the sub-wavelength grating mirror can be determined according to the expression:

$$\phi(x) = \phi_0 + \frac{2\pi}{\lambda R_M}x^2$$

where $\phi_0$ is the largest phase shift, $R_M$ is the spherical radius or curvature of the mirror (i.e., $R_M=2f$), and x represents the distance from the center of the mirror, as shown in FIG. 10, with the constraint $0 \leq x \leq A$. FIG. 11 shows an exemplary plot of the target phase $\phi(x)$ for a cylindrical mirror determined in accordance with embodiments of the invention. In FIG. 11, curve 1102 corresponds to the target phase $\phi(x)$ over the distance from the center of the mirror $x=0$ to the edge of the aperture $x=A$ with $\phi_0=-2.6$. In other words, the target phase $\phi(x)$ 1102 represents a desired phase change acquired by light polarized in the x-direction and reflected from the sub-wavelength grating mirror between x=0 and x=A.

The target phase change φ(x) shown in FIG. 11 and the phase contour information represented in FIG. 8 can be used in combination to determine an appropriate fixed period and duty cycles in the x-direction of sub-wavelength grating mirror 1000. For example, suppose the minimum reflectivity required is 98%. For the fixed period sub-wavelength grating mirror 1000, the optimum period can be determined by matching points of the target phase φ(x) 1002, shown in FIG. 10, with points of the phase contour surface of FIG. 10, with the constraints that the period lies between $p_{min}$ and $p_{max}$, and the points x=0 and x=A μm intersect the 98% reflectance contours 814 and 812, respectively. This is equivalent to the conceptual operation of overlaying the phase φ(x) 1102 on the contour surface of FIG. 10 with the target phase φ(x) 1102 directed perpendicular to the period axis, between $p_{min}$ and $p_{max}$, such that x=0 and x=A μm intersect the reflectance contours 1014 and 1012, respectively, and the values of the target phase φ(x) 1102 substantially correspond to values of the phase contour surface. Referring now to the contour plot shown in FIG. 8, line 818 between points 820 and 822 corresponds to phase φ(x) 1102 substantially matching phase values of the phase contour surface between $p_{min}$ and $p_{max}$. The point 822 on the 98% reflectivity contour 812 corresponds to phase φ(A), and the point 820 on the 98% reflectivity contour 814 corresponds to phase φ(0). The line 818 intersects the period axis at 670 nm, which corresponds to the optimum fixed period. The duty cycles associated with the regions of the sub-wavelength grating mirror 1000 along the x-direction can now be determined by reading the duty cycle values between the points 820 and 822.

Figure 12:
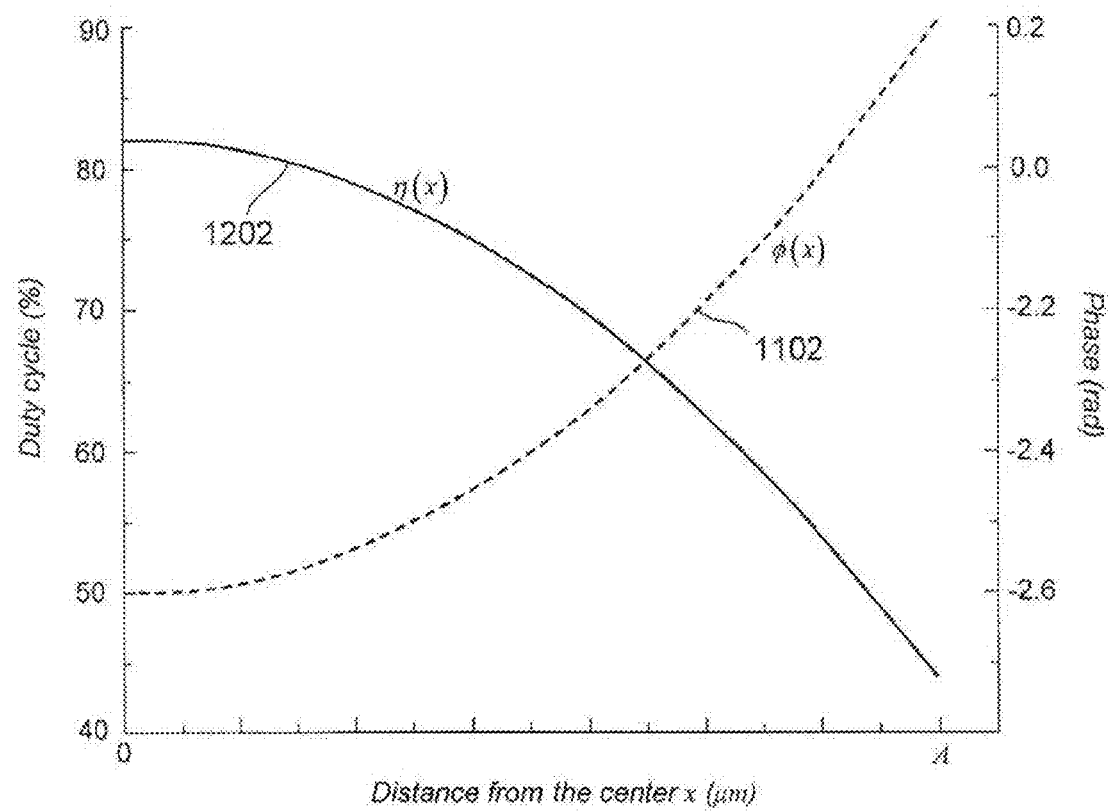
FIG. 12 shows a plot of a duty cycle according to an embodiment of the invention.

FIG. 12 shows a plot of the duty cycle as a function of the x-coordinate between x=0 and x=A in accordance with embodiments of the invention. Curve 1202 represents the duty cycle η(x) determined by overlaying target phase φ(x) 1102 on the phase contour surface and reading off the corresponding duty cycle from the duty cycle axis between points 820 and 822 of FIG. 8. Duty cycle η(x) 1202 can be used to determine the duty cycle for points along the x-direction of sub-wavelength grating mirror 1000. The x-coordinates as a function of the period p, phase change, duty cycle, and line width (i.e., w=ηp) for the hypothetical target phase φ(x) 1102 are presented in a look-up table:

TABLE I

| x | φ (radians) | η (%) | w (μm) |
|---|---|---|---|
| 0 | −2.6 | 82 | 0.122 |
| p | −2.3 | 77.8 | 0.116 |
| 2p | −2.0 | 73.6 | 0.110 |
| 3p | −1.7 | 69.4 | 0.104 |
| 4p | −1.4 | 65.2 | 0.097 |
| 5p | −1.1 | 61.0 | 0.091 |
| 6p | −0.8 | 56.8 | 0.085 |
| 7p | −0.5 | 52.4 | 0.078 |
| 8p | −0.2 | 48.2 | 0.072 |
| A | 0.1 | 44 | 0.066 |

The example results presented in look-up Table I can be used to fabricate a sub-wavelength grating cylindrical mirror by providing the x coordinates, period, and line width as input to a lithographic micro-chip processing tool, such as a processing tool for fabricating standard CMOS device. For example, an sub-wavelength grating cylindrical mirror can be fabricated in 450 nm thick amorphous Si deposited on a quartz substrate at approximately 300° C. using plasma-enhanced chemical vapor deposition. The grating pattern can be defined using electron beam lithography with a commercial hydrogen silsequioxane negative resist, FOX-12®, exposed at 200 μC/cm² and developed for 3 minutes in a solution of MIF 300 developer. After development, the grating patterns can be descummed using $CH_4/H_2$ reactive ion etching to clear the resist residue from the grooves between the grating lines. The Si lines can be formed by dry etching with $HBr/O_2$ chemistry. At the end of the process, a 100 nm thick resist layer may remain on top of the Si lines, which was included in the numerical simulation results described below. The grating can also be fabricated using photolithography, nano-imprint lithography, or e-beam lithography with a positive tone resist.

Figure 13:
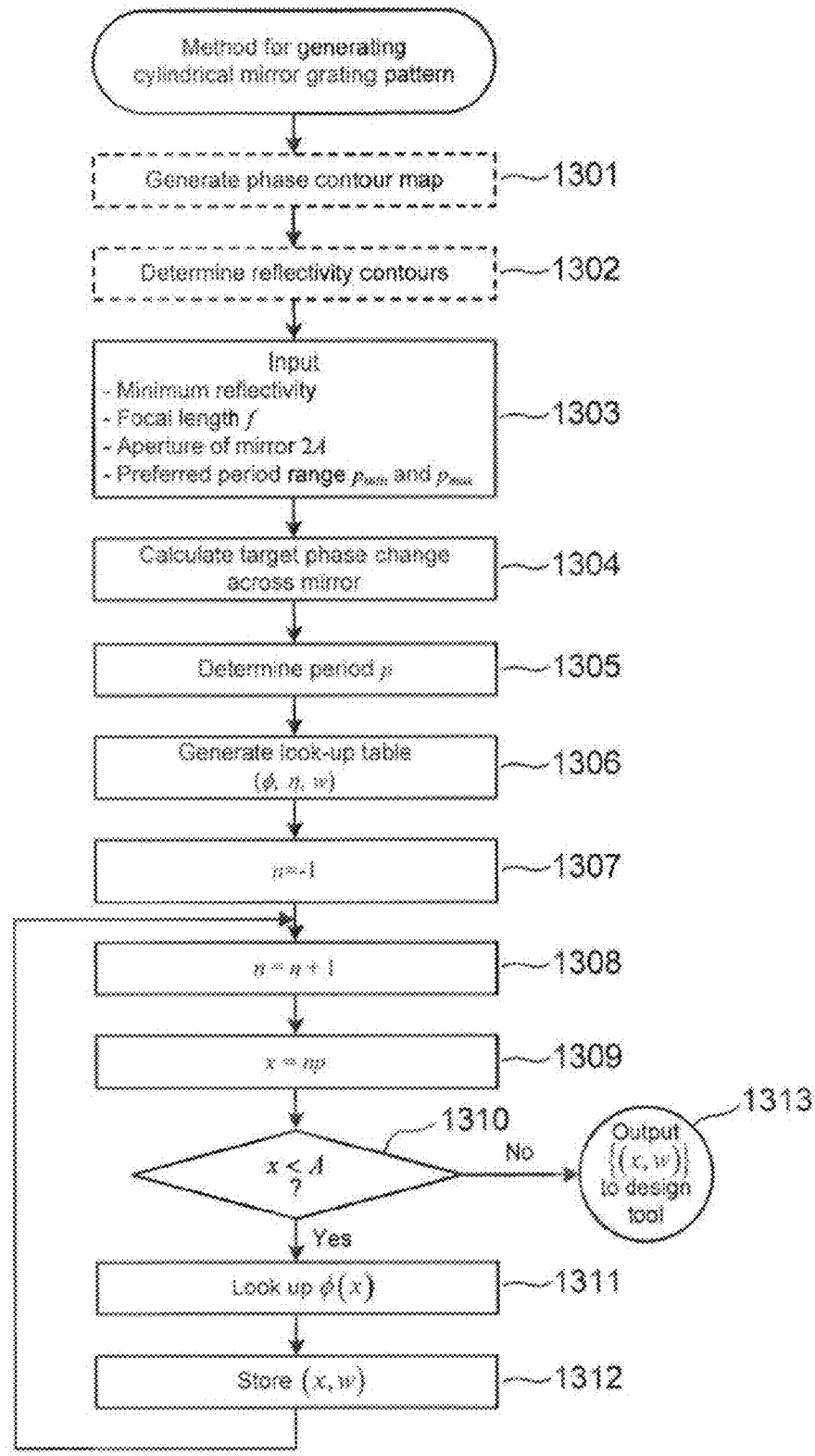
FIG. 13 shows a control-flow diagram of a method for generating a grating pattern for a focusing sub-wavelength grating cylindrical mirror according to an embodiment of the invention.

FIG. 13 shows a control-flow diagram of a method for generating a grating pattern with a fixed period for a focusing sub-wavelength grating cylindrical mirror in accordance with embodiments of the invention. Steps 1301 and 1302 are identical to the steps 901 and 902 of FIG. 9, as described above. In step 1303, the desired minimum reflectivity, focal length, aperture of the mirror 2A, and the preferred period range are input, as described above with reference to FIG. 10. In step 1304, the target phase change across the mirror along the x-direction is calculated as described above with reference to FIG. 11. In step 1305, the period p can be determined by matching the target phase change with a portion of the phase contour map with the constraints imposed by the minimum reflectivity and period range, as described above with reference to FIG. 8. In step 1306, a look-up table representing the relationship between phase and the line width is determined as described above with reference to FIG. 12 and Table I. In step 1307, the period number n is initialized to the integer value −1. In step 1308, the period number is incremented. In step 1309, the x-coordinate is determined by x=np. In step 1310, when x is less than A, the method proceeds to step 1311. Otherwise the method proceeds to step 1313. In step 1311, for the x determined in step 1309, the corresponding phase is determined from the look-up table determined in step 1306. In step 1312, the x-coordinate and line width is stored as a data set {(x,w)} in a computer-readable medium. In step 1313, the data set is provided to a design tool for fabricating a sub-wavelength grating cylindrical mirror with the target phase change determined in step 1304, as described above.

Figure 14:
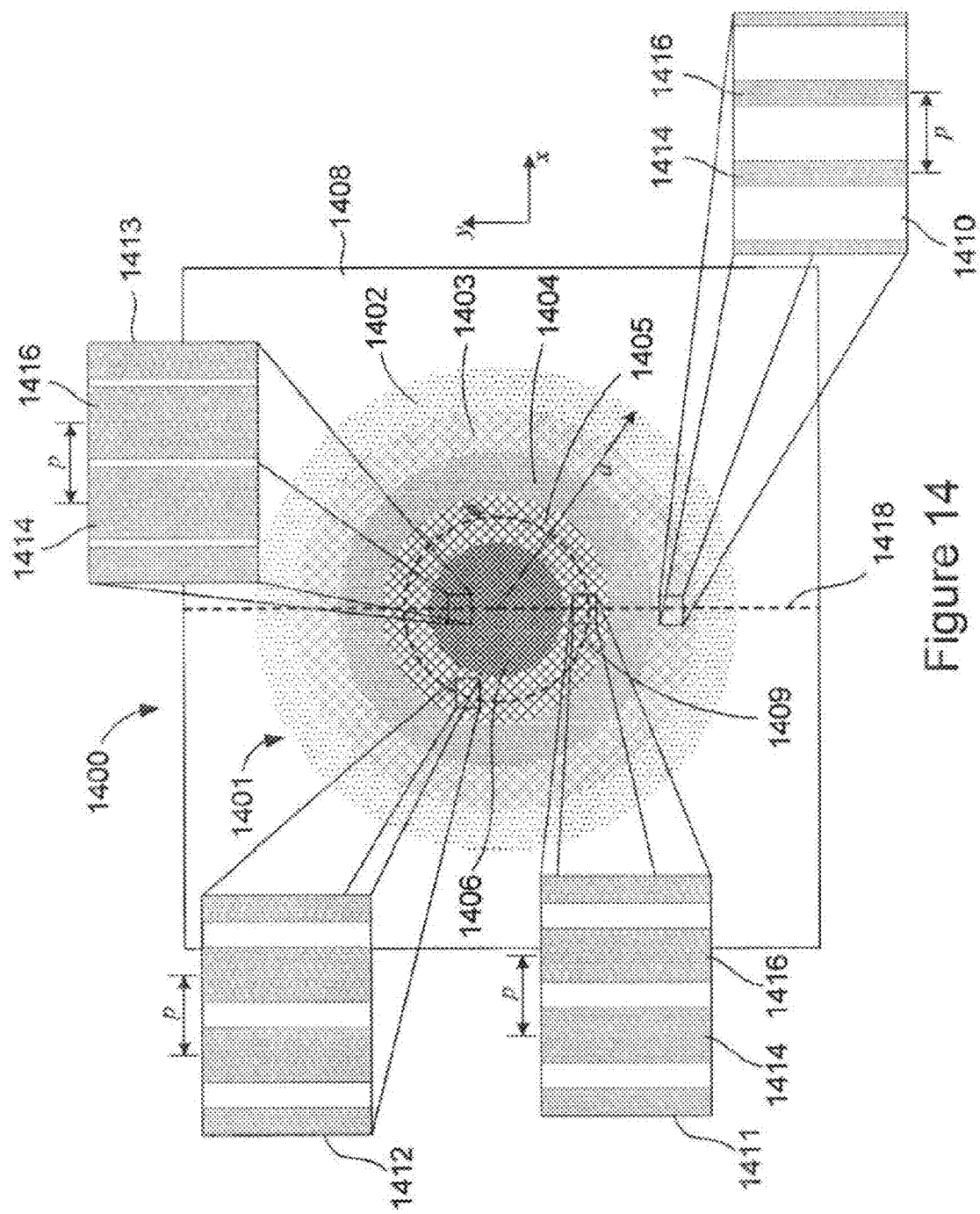
FIG. 14 shows a top plan view of a one-dimensional sub-wavelength grating configured to operate as a focusing spherical mirror according to an embodiment of the invention.

In certain embodiments, a sub-wavelength grating with a constant period can be configured to operate as a spherical mirror for incident light polarized in a particular direction by tapering the lines of the grating layer away from the center of the sub-wavelength grating. FIG. 14 shows a top plan view of one-dimensional sub-wavelength grating 1400 configured to operate as a focusing spherical mirror for incident light polarized in the x-direction in accordance with embodiments of the invention. Sub-wavelength grating 1400 includes a grating layer 1401 represented by annular shaded regions 1402-1406. Grating layer 1401 can be composed of a material having a relatively higher refractive index than substrate 1408. Grating layer 1401 defines a circular mirror aperture extending out from the origin with radius a. Each shaded annular region represents a different grating sub-pattern of lines formed in grating layer 1401. The grating sub-patterns of annular regions 1402-1406 have the same duty cycle as revealed in the four enlargements 1410-1413. The enlargements 1410-1413 show that the grating pattern formed in grating layer 1401 comprises tapered lines running in the y-direction with a constant line period p in the x-direction. In particular, enlargements 1410, 1411, and 1413 are enlargements of lines 1414 and 1416 running parallel to dashed-line 1418 in the y-direction. Enlargements 1410, 1411, and 1413 show that the period p remains constant but the width of lines 1414 and 1416 narrows away from the center of grating layer 1401. Each annular region has the same duty cycle and period. For example, enlargements 1411 and 1412 reveal that annular region 1405 comprises portions of different lines that have substantially the same duty cycle. As a result, each portion of an annular region results in the same approximate phase shift in the light reflected from the annular region. For example, dashed circle 1409 represents a single phase shift contour in which light reflected from anywhere in annular region 1405 acquires substantially the same phase q.

Figure 15:
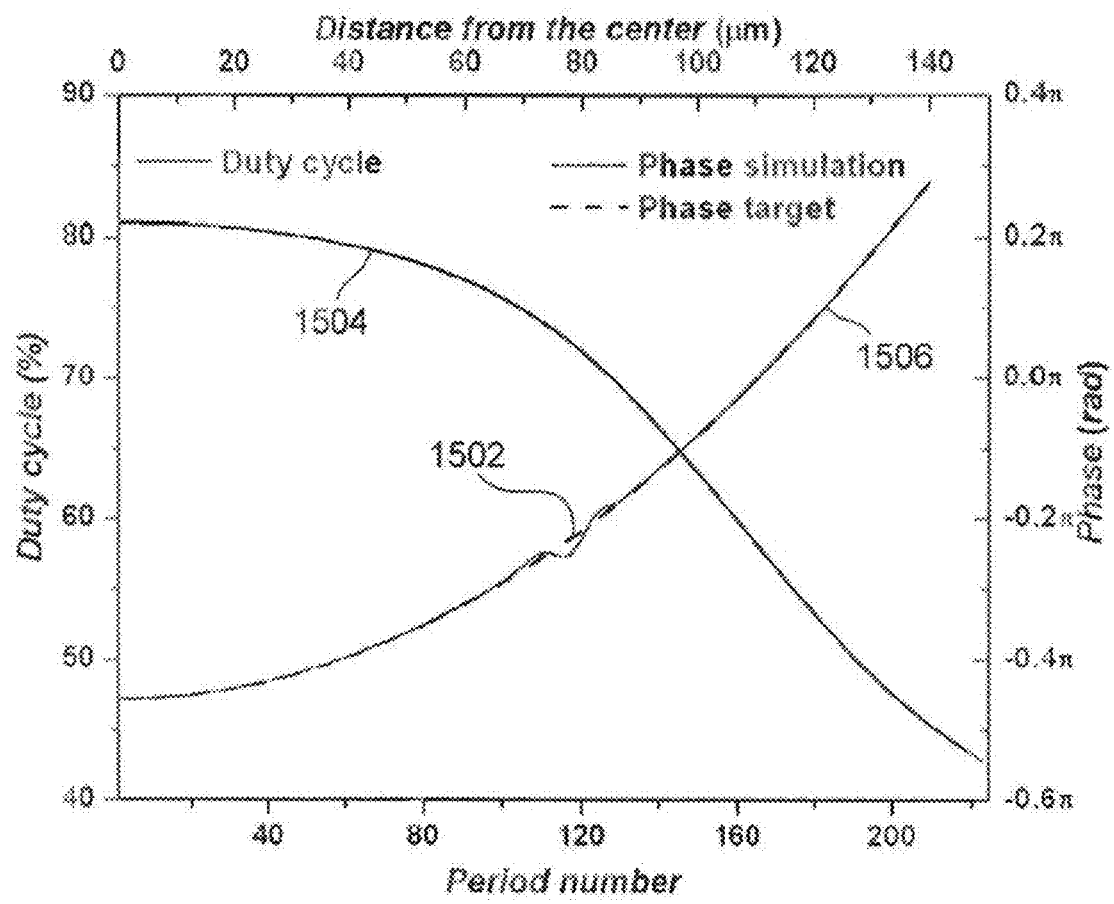
FIG. 15 shows an exemplary plot of a target phase change for a spherical mirror according to an embodiment of the invention.

Fabrication of sub-wavelength grating spherical mirror 1400 is analogous to fabrication of sub-wavelength grating cylindrical mirror 1000 described above. Prior to fabricating sub-wavelength grating spherical mirror 1400, a minimum reflectivity, focal length f, mirror aperture radius a, and preferred period range $p_{min}$ and $p_{max}$ are determined. Once the parameters for sub-wavelength grating spherical mirror 1400 have been determined, a desired or target phase change across the mirror extending out from the center is selected. For a spherical focusing mirror, the target phase change across sub-wavelength grating mirror can be determined according to the expression:

$$\phi(x) = \phi_0 + \frac{2\pi}{\lambda R_M} r_{rad}^2$$

where $\phi_0$ is the largest phase shift near the center of the mirror, $R_M$ is the spherical radius or curvature of the mirror, and $r_{rad}$ is the radius of the aperture from the center of the mirror with the constraints $0 \leq r_{rad} \leq a$ and $r_{rad}^2 = x^2 + y^2$. FIG. 15 shows an exemplary plot of the target phase $\phi(r_{rad})$ for a spherical mirror in accordance with embodiments of the invention. In FIG. 15, dashed curve 1502 represents the desired or target phase change $\phi(r_{rad})$ across the mirror from the center of the mirror $r_{rad}=0$ to the edge of the aperture $r_{rad}=a$. The target phase change can be matched to the phase contour surface in the manner described above with reference to FIG. 10 in order to determine period p, duty cycle $\eta(r_{rad})$, and look-up table of phases and duty cycle values as described above with reference to the look-up Table I. FIG. 15 also includes curve 1504 representing the change in the duty cycle $\eta(r_{rad})$ as a function of $r_{rad}$.

Figure 16:
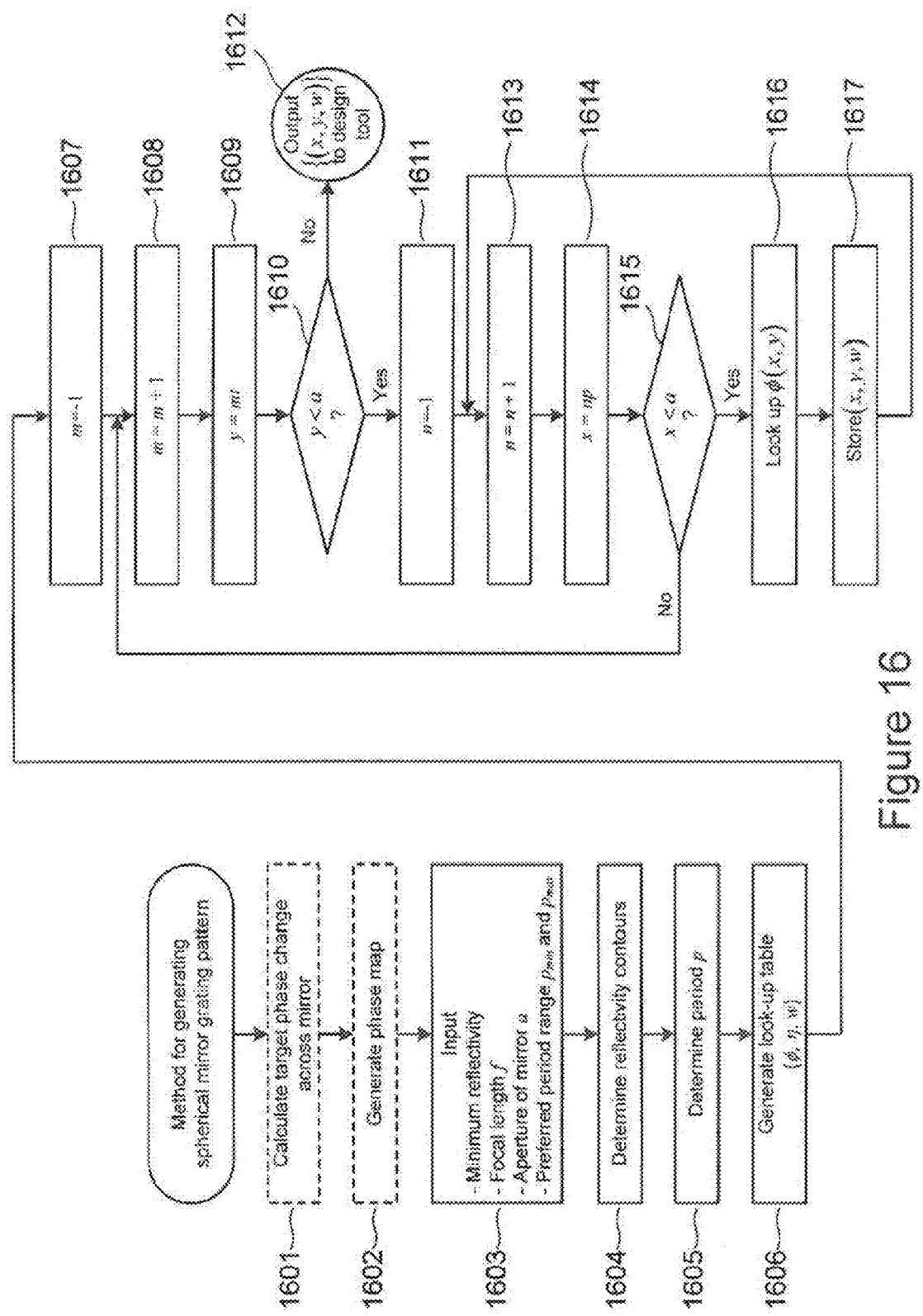
FIG. 16 shows a control-flow diagram of a method for generating a spherical mirror grating pattern for a focusing sub-wavelength grating spherical mirror according to an embodiment of the invention.

Methods for generating a spherical mirror grating pattern data are analogous to the methods for generating cylindrical mirror grating pattern data described above with reference to the control-flow diagram of FIG. 13, but with additional steps for accounting for tapering of lines in the y-direction. FIG. 16 shows a control-flow diagram of a method for generating a spherical mirror grating pattern for light polarized in the x-direction in accordance with embodiments of the invention. Steps 1601 and 1602 are identical to steps 1301 and 1302, respectively, of the method described above with reference to FIG. 13. In step 1603, the minimum reflectivity, focal length, mirror radius a, and the preferred period range are input, as described above. In step 1604, the target phase change across the mirror along the radius $r_{rad}$ is calculated as described above with reference to FIG. 14. In step 1605, period p is determined by matching the target phase change $\phi(r_{rad})$ with a portion of the phase contour map, shown in FIG. 8, with the constraints imposed by the minimum reflectivity and period range. In step 1606, a look-up table representing the phase $\phi(r_{rad})$ and the corresponding line width as a function of the radius $r_{rad}$ is determined. In step 1607, the number m is initialized to the integer value −1. In step 1608, m is incremented. In step 1609, the y-coordinate is determined by y=mt, where t is the period in the y-direction. In step 1610, when y is less than a, proceed to step 1611. Otherwise, proceed to step 1612. In step 1612, the data set created below in steps 1616 and 1618 is sent to the design tool for processing. In step 1611, the number n is initialized to the integer value −1. In step 1612, n is incremented. In step 1614, the x-coordinate is determined by x=np. In step 1615, when x is less than a, the method proceeds to step 1616. Otherwise, the method returns and repeats steps 1608-1614. In step 1616, for x and y determined in steps 1614 and 1609, respectively, the corresponding phase is determined from the look-up table determined in step 1606. In step 1618, the width w corresponding the phase in the look-up table is recorded in a data file along with the x and y coordinates.

IV. Implementation

Figure 17:
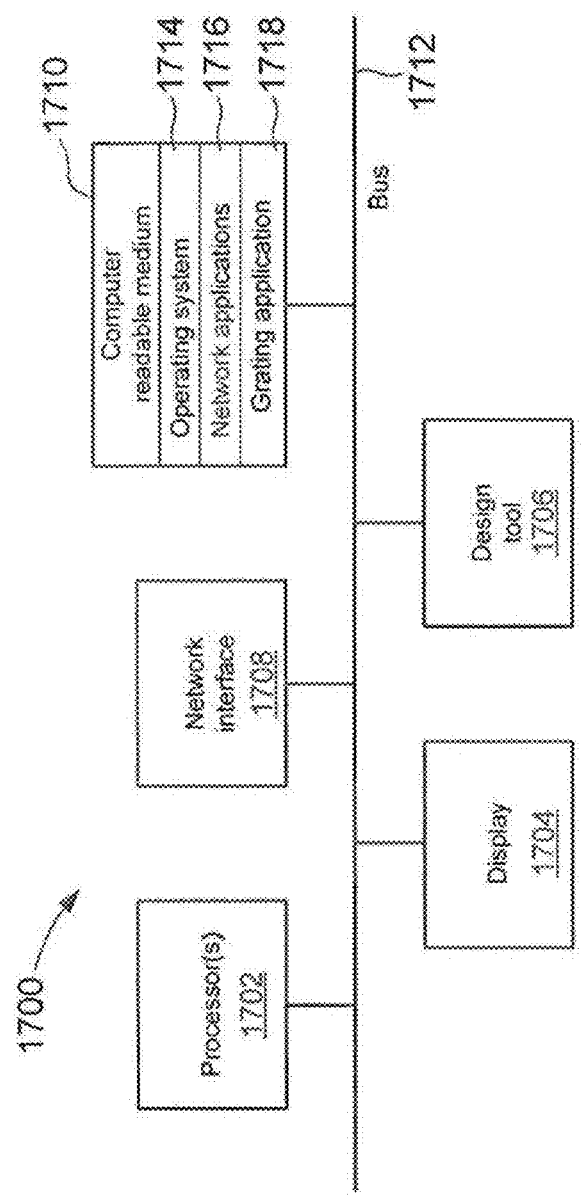
FIG. 17 shows a schematic representation of a computing device configured according to an embodiment of the invention.

In general, the methods employed to generate SWG gating pattern data described above with reference to FIGS. 9, 13 and 16 can be implemented on a computing device, such as a desktop computer or a laptop. FIG. 17 shows a schematic representation of a computing device 1700 configured in accordance with embodiments of the present invention. The device 1700 includes one or more processors 1702, such as a central processing unit; one or more display devices 1704, such as a monitor; a design tool interface 1706; one or more network interfaces 1708, such as a Local Area Network LAN, a wireless 802.11x LAN, a 3G mobile WAN or a WiMax WAN; and one or more computer-readable mediums 1710. Each of these components is operatively coupled to one or more buses 1712. For example, the bus 1712 can be an EISA, a PCI, a USB, a FireWire, a NuBus, or a PDS.

The computer readable medium 1710 can be any suitable medium that participates in providing instructions to the processor 1702 for execution. For example, the computer readable medium 1710 can be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 1710 can also store other software applications, including word processors, browsers, email, Instant Messaging, media players, and telephony software.

The computer-readable medium 1710 may also store an operating system 1714, such as Mac OS, MS Windows, Unix, or Linux; a network applications 1716; and a grating application 1718. The operating system 1714 can be multi-user, multiprocessing, multitasking, multithreading, real-time and the like. The operating system 1714 can also perform basic tasks such as recognizing input from input devices, such as a keyboard or a keypad; sending output to the display 1704 and the design tool 1706; keeping track of files and directories on medium 1710; controlling peripheral devices, such as disk drives, printers, image capture device; and managing traffic on the one or more buses 1712. The network applications 1716 includes various components for establishing and maintaining network connections, such as software for implementing communication protocols including TCP/IP, HTTP, Ethernet, USB, and FireWire.

The grating application 1718 provides various software components for generating grating pattern data, as described above. In certain embodiments, some or all of the processes performed by the application 1718 can be integrated into the operating system 1714. In certain embodiments, the processes can be at least partially implemented in digital electronic circuitry, or in computer hardware, firmware, software, or in any combination thereof.

V. Other Sub-Wavelength Gratings

Embodiments of the invention are not limited to cylindrical and spherical mirrors configured to focus light polarized in a particular direction. In still other embodiments, sub-wavelength gratings can be configured to provide arbitrary phase front shape modulation. Embodiments of the invention also include planar sub-wavelength gratings mirrors that can be configured to operate as focusing spherical mirrors for light polarized in any direction.

Figure 18A:
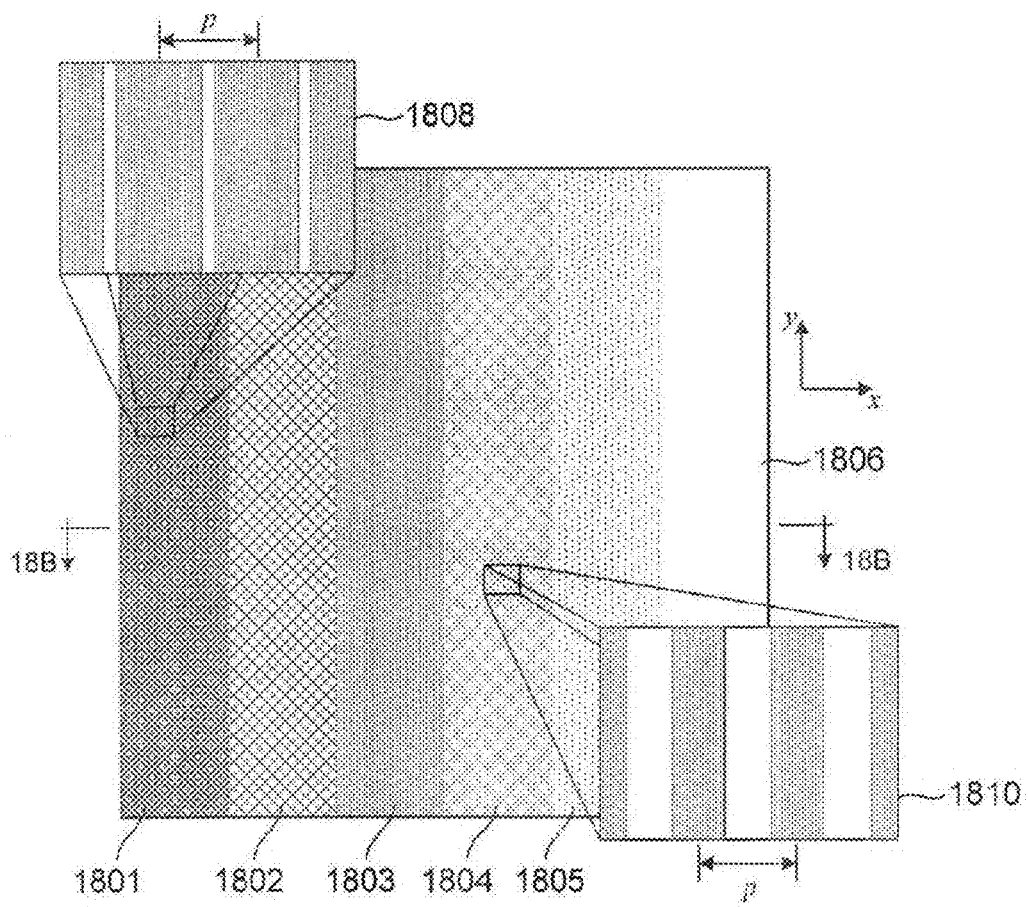
FIG. 18A shows a top plane view of a one-dimensional sub-wavelength grating configured to reflect normal incident light into a particular direction according to an embodiment of the invention.
Figure 18B:
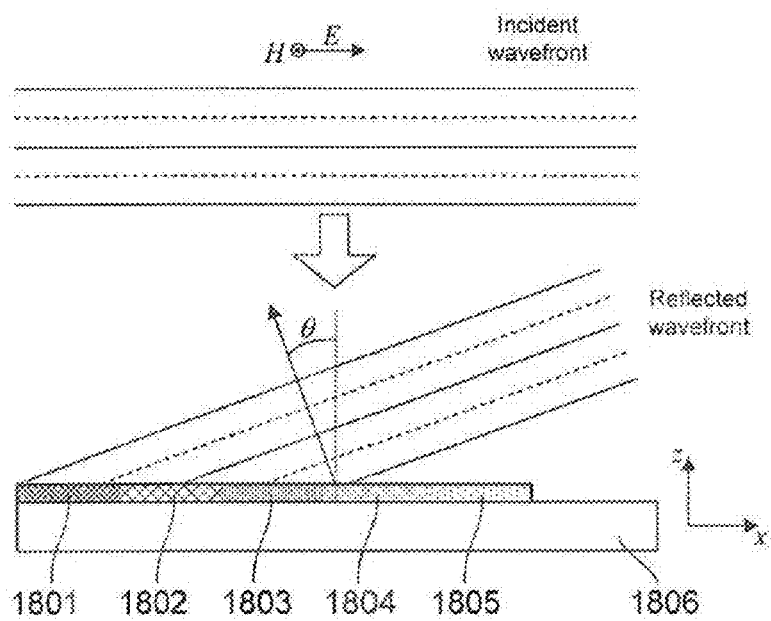
FIG. 18B shows a cross-sectional view of the sub-wavelength grating along a line 18B-18B, shown in FIG. 18A, operated according to an embodiment of the invention.

In certain embodiments, sub-wavelength gratings can be configured as mirrors that reflect light with a particular direction away from the surface normal. FIG. 18A shows a top plan view of a one-dimensional sub-wavelength gratings 1800 configured to reflect normal incident light polarized in the x-direction in accordance with embodiments of the invention. The grating layer is composed of regions 1801-1806, with each region formed from lines extending in the y-direction, having the same period, but with the duty cycle progressively decreasing from region 1801 to region 1806. Enlargements 1808 and 1810 show sub-regions of regions 1801 and 1804 with period p and that region 1801 has a relatively larger duty cycle than region 1804. The duty cycles for regions 1801-1806 are selected so that the resulting phase change in the reflected light is largest for region 1801 and decreases linearly from region 1801 to region 1806. FIG. 18B shows a cross-sectional view of sub-wavelength gratings 1800 along line 18B-18B, shown in FIG. 18A, operated in accordance with embodiments of the invention. The phase change causes incident light polarized in the x-direction and directed normal to the first surface to be reflected with angle θ away from surface normal 1812.

Figure 19A:
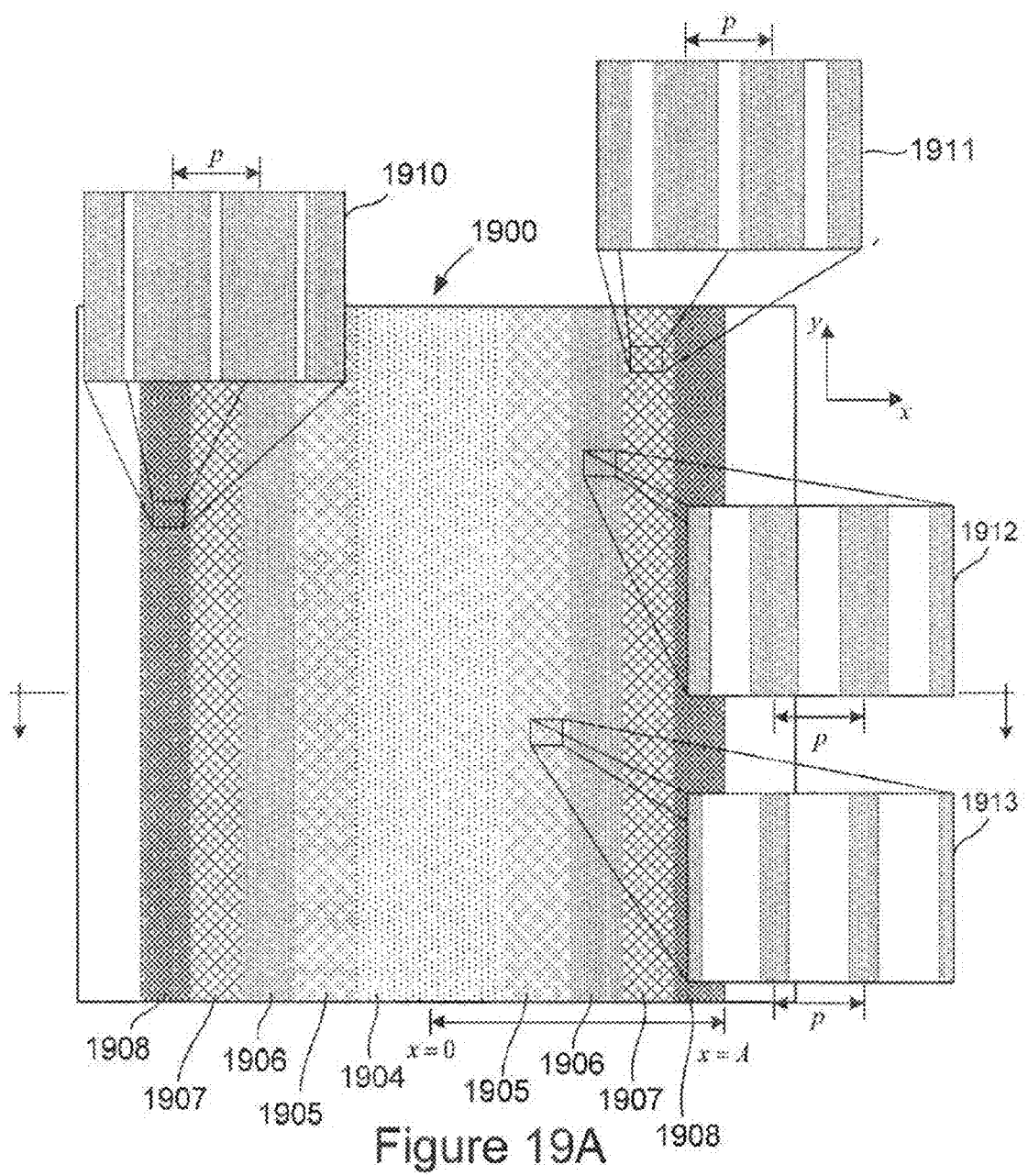
FIG. 19A shows a top plan-view of a one-dimensional sub-wavelength grating configured to operate as a diverging cylindrical mirror for incident light polarized parallel to the x-direction according to an embodiment of the invention.
Figure 19B:
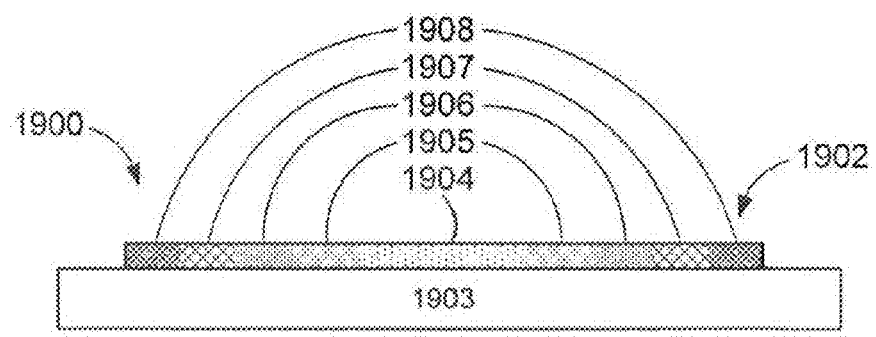
FIG. 19B shows a cross-sectional view of the sub-wavelength grating along a line 19B-19B, shown in FIG. 19A, according to an embodiment of the invention.

In other embodiments, sub-wavelength gratings can be configured to operate as a diverging mirror by imprinting an appropriate grating pattern in the grating layer with a duty cycle that increases away from the center of the sub-wavelength grating. For example, FIG. 19A shows a top plan-view of one-dimensional sub-wavelength grating 1900 configured to operate as a diverging cylindrical mirror for incident light polarized in the x-direction in accordance with embodiments of the invention. FIG. 19B shows a cross-sectional view of the sub-wavelength grating 1900 along line 19B-19B, shown in FIG. 19A, in accordance with embodiments of the invention. As shown in FIG. 19B, sub-wavelength grating 1900 comprises grating layer 1902 disposed on a surface of substrate 1903. Grating layer 1902 defines a mirror aperture extending the length of sub-wavelength gratings 1900 in the y-direction and having a length 2A in the x-direction. FIGS. 19A-19B include shaded regions 1904-1908 of grating layer 1902 that are the reverse order of the shaded regions 904-908 shown in FIG. 9. For example, enlargements 1910-1913 show that duty cycle q increases away from the center x=0. The grating layer 1902 is configured to cause reflected light polarized in the x-direction to diverge, as described above with reference to FIG. 6B. The diverging sub-wavelength grating cylindrical mirror 1900 can be fabricated in the same manner as the focusing sub-wavelength grating cylindrical mirror 900 but with the target phase described above with reference to FIG. 11 equal to −φ(x). In other embodiments, divergent sub-wavelength grating spherical mirrors can be also be obtained by reversing order of the shaded regions.

In other embodiments, sub-wavelength gratings can be configured with a two-dimensional grating pattern by patterning in the x- and y-directions, as described above with reference to FIGS. 9, 13, and 16.

In other embodiments sub-wavelength gratings can be configured to work in transmission by the addition of appropriate layers of dielectrics.

VI. Results

Figure 20:
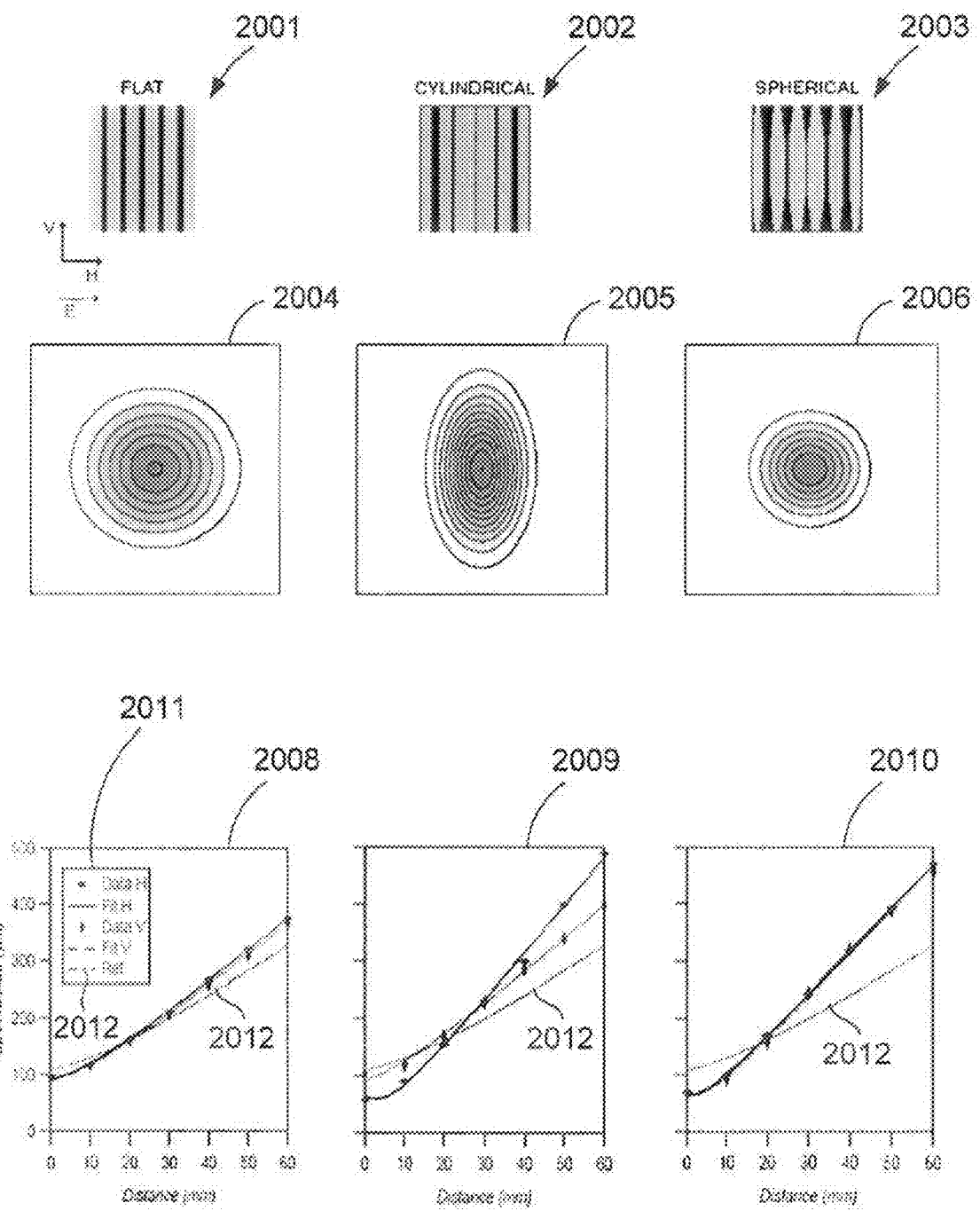
FIG. 20 shows beam profiles and reflected beam radii for flat, cylindrical, and spherical sub-wavelength grating mirrors fabricated according to an embodiment of the invention.

FIG. 20 shows schematic representations of line distributions for flat 2001, cylindrical 2002, and spherical 2003 sub-wavelength gratings mirrors configured in accordance with embodiments of the invention. Flat, cylindrical, and spherical sub-wavelength gratings mirrors were fabricated with a period of 670 nm in a 450 nm thick amorphous Si layer disposed on a quartz substrate, with a minimum reflectance of 98%. For the flat and cylindrical sub-wavelength gratings mirrors 2001 and 2002, the lines are rectangular. For the spherical sub-wavelength gratings mirror, the width of each line is tapered, as described above with reference to FIG. 13. FIG. 20 includes contour plots of measured reflected beam profiles 2004-2006 corresponding to sub-wavelength gratings mirrors 2001-2003, respectively, for incident light polarized perpendicular to the lines. Beam profiles 2004-2006 are produced for the incident Gaussian-shaped beam. Flat sub-wavelength gratings 2001 produces Gaussian-shaped beam profile 2004 that is substantially the same as the beam profile of the incident Gaussian-shaped beam. The reflected beam profile is relatively broader than beam profiles 2005 and 2006. Beam profile 2005 indicates cylindrical sub-wavelength grating 2002 reflects a Gaussian-shaped beam that is narrowed in the direction perpendicular to the lines (the "H" direction), and unchanged in the direction parallel to the lines (the "V" direction). Beam profile 2006 reveals that spherical sub-wavelength gratings 2003 produces a narrower Gaussian-shaped reflected beam in all directions than the flat sub-wavelength grating mirror 2001 and a narrower reflected beam in the V direction than the cylindrical mirror 2002. In summary, flat sub-wavelength gratings 2001 does not focus but merely reflects incident light. Cylindrical sub-wavelength gratings 2002 focuses reflected light perpendicular to the lines. And the tapered lines of the spherical sub-wavelength gratings 2003 enable spherical sub-wavelength gratings 2003 to focus independent of the line direction.

FIG. 20 also includes plots 2008-2010 of reflected beam radii as a function of distance from the three types of mirrors. The zero in the distance axis corresponds to the position of the waist of the reflected beam. The horizontally and vertically direction diamonds, represented in legend 2011, correspond to measured beam radius of the reflected beam along the H direction and V direction, respectively, and the continuous lines passing through the diamonds in each plot are best fits. The line 2012 represents the radius of the beam reflected from a plane mirror and is included for comparison. Plots 2008 and 2010 show that the reflected beam radii along H and V directions for the flat and spherical sub-wavelength gratings are nearly indistinguishable, while spherical sub-wavelength gratings give a smaller beam spot for the same incident, indicating a focusing power along both H and V directions as designed. On the other hand, for the cylindrical sub-wavelength gratings, the reflected beam radii along the H direction is narrower for relatively shorter distances and broader for relatively longer distances than the that in the V direction. This indicates that the mirror gives focusing power along the H direction only, which is also predicted by the design.

Beam parameters were reconstructed from the measured beam radii at various positions. Using these beam parameters, the mirror focal length was determined to be 20±3 mm for the cylindrical and spherical mirrors, which is close to the design value of 17.2 mm. The reflectivity of the mirrors was in the range of 80-90%, lower than the expected 98%. This discrepancy is likely due to the feature size deviation from the design because of the proximate effects in the electron beam lithographic step, as well as surface roughness of the Si lines.

VII. Additional Measures for Controlling Phase Response in a Sub-Wavelength Grating Mirror The inventors have encountered instances in which a sub-wavelength grating mirror may have excellent reflectivity (approaching 1.0) but does not exhibit suitable phase response. Thus, as previously mentioned herein, when the designer has selected a grating layer having line widths, line thicknesses, and line spacing that approach the desired reflectivity the designer can then select a substrate height that brings about additional control over the phase of the reflected light. By way of tighter control over the phase of the reflected light, the efficiency of the sub-wavelength grating mirror can be improved. This enhancement becomes especially useful in focusing light arriving at oblique angles as well as allowing the mirror to operate over a wider spectrum of wavelengths than is possible when a substrate is not used.

Figure 21:
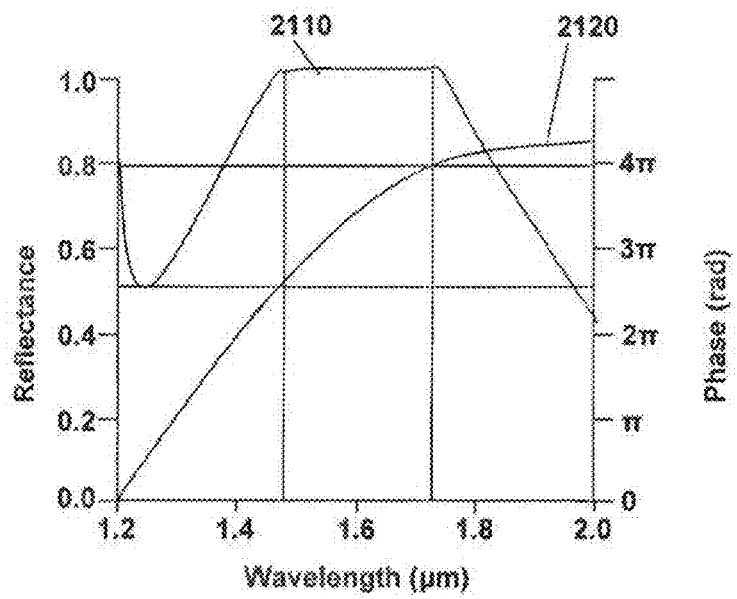
FIG. 21 shows the reflectance and phase response of an exemplary sub-wavelength grating device as a function of the wavelength of the incident light according to an embodiment of the invention.

To illustrate the above, FIG. 21 (which resembles a simplified version of FIG. 7 herein) shows the reflectance and phase response of an exemplary mirror as a function of the wavelength of the incident light. Reflectance curve 2110 begins at approximately 0.8 at a wavelength of 1.2 μm, dips to a minima of around 0.5 at approximately 1.28 μm, and then approaches 1.0 from approximately 1.48 μm to 1.73 μm. The reflectance then decreases as the wavelength of the incident light approaches 2.0 μm. Also in FIG. 21, phase response curve 2120 can be seen as approaching 0 radians at a wavelength of 1.2 μm, increasing in a nearly linear manner until approximately 1.7 μm, and then increasing slightly to achieve a value of slightly more than 4π radians at a wavelength of 2.0 μm.

As discussed in relation to FIGS. 2 and 3, herein, a change the phase (φ) of the reflected light beam can be brought about by varying the duty cycle of the grating or the period of the grating. Thus, in some instances, a first sub-wavelength grating having an approximately 50-60% duty cycle (such as in FIG. 22) may provide a wavefront having a certain relative phase. Meanwhile, a second sub-wavelength grating having a much lower duty cycle (such as perhaps 20%, as shown in FIG. 23) may provide a wavefront having only a slightly different relative phase (such as shown in FIG. 24). And, when operating the mirror, the inability to control the phase change range as a function of the duty cycle of the sub-wavelength grating at particular frequencies of operation is a significant performance-limiting factor. Thus, embodiments of the invention include additional measures for increasing phase shift (φ) from perhaps π to possibly 2π and beyond.

As can be inferred from FIG. 21, a designer may have difficulty in achieving both high reflectance as well as a desired phase response. FIG. 21 indicates that the designer may have the freedom to select a desired phase response at the expense of high reflectance. Conversely, if high reflectance is desired, this may come at the expense of a suitable phase response.

Figure 22:
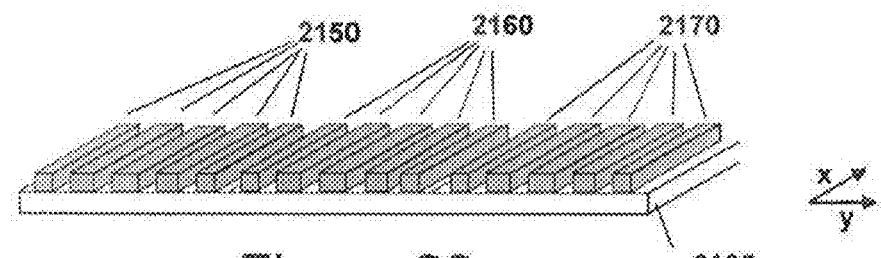
FIG. 22 is a perspective view of a portion of a grating layer of a sub-wavelength grating device according to an embodiment of the invention.
Figure 23:
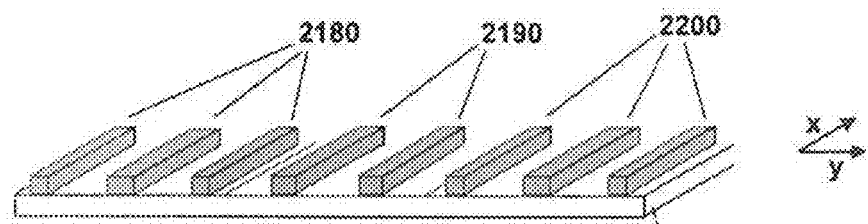
FIG. 23 is a perspective view of a portion of a grating layer of a sub-wavelength grating device also according to an embodiment of the invention.

FIG. 22 is a perspective view of a portion of a grating layer of a sub-wavelength grating device according to an embodiment of the invention. In FIG. 22, sub-patterns 2150, 2160, and 2170, having a duty cycle of perhaps 50 to 60%, are positioned atop mechanical stability layer 2165 and characterized by a particular periodic spacing of dielectric rods in the y direction with each of the rods extending into the x direction. In FIG. 22, the spacing between each of the dielectric rods that makes up sub-patterns 2150, 2160, and 2170, the width of each of the rods, and the thickness (height) of each of the rods are analyzed by way of numerical methods-based analysis packages such as MEEP or COMSOL Multiphysics®. When such analysis is performed and the reflectance and phase properties of the substrate are ascertained, the device designer may decide that additional phase shift in the reflected light is required.

FIG. 23 is a perspective view of an exemplary portion of a grating layer of a sub-wavelength grating device also according another embodiment of the invention. In contrast to the sub-wavelength grating of FIG. 22, the grating of FIG. 23 possesses a duty cycle of perhaps 20%. FIG. 24 shows the reflectance and phase response of the sub-wavelength grating device of both FIGS. 22 and 23 as a function of the wavelength of the incident light according to an embodiment of the invention. In FIG. 24, phase response curve 2120, which results from sub-patterns 2150, 2160, and 2170 of FIG. 22 is shown as being only slightly different from the phase response curve 25, which results from sub-patterns 2180, 2190, and 2200 of FIG. 3 even though the duty cycles of the sub-wavelength gratings of FIGS. 22 and 23 are substantially different. It is this particular inflexibility in the phase responses, as a function of the duty cycle of the sub-wavelength grating layer that embodiments of the invention seek to remedy.

FIG. 25 is a perspective view of a portion of a sub-wavelength grating layer of a sub-wavelength grating device according to an embodiment of the invention. In FIG. 25, a stepped substrate is used to elevate sub-patterns 2250 and 2270 with only sub-pattern 2260 being affixed directly to mechanical stability layer 2265. Numerical analysis of the structure of FIG. 25 has shown that the use of a bi-level substrate introduces additional phase shift of the light reflected from the surface of the grating layer.

FIG. 26 is an end-on view of a portion of a grating layer of a sub-wavelength grating device according to an embodiment of the invention. In FIG. 26, sub-pattern 2250 has been affixed to substrate 2255. Sub-pattern 2270 has been affixed to substrate 2275. Sub-pattern 2260, is affixed only to mechanical stability layer 2265 without an intervening substrate. In the embodiment of FIG. 26, substrates 2255 and 2275 are of a thickness equal to π radians (one half of the free-space wavelength at the center frequency of operation). Thus, as the incident light impinges on the grating of FIG. 26, substrates 2255 and 2275 provide additional phase change over and above that provided by each of the sub-patterns that constitute the grating layers.

The phase change introduced by the addition of substrate 2255, for example, is shown in the lower portion of FIG. 26. Light that impinges upon the left portion of sub-pattern 2250 acquires a phase shift approximately equal to π radians in relation to light that impinges upon sub-pattern 2260. In a similar manner, light that impinges upon the left portion of sub-pattern 2270 also acquires a phase shift equal to π radians in relation to light that impinges upon sub-pattern 2260.

Figure 27:
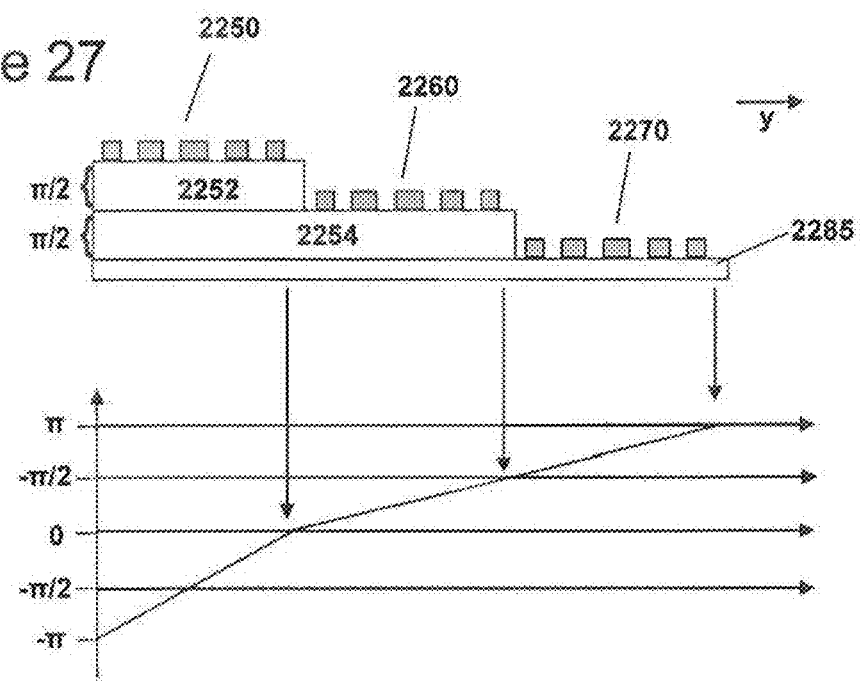
FIGS. 27-30 are views of a portion of a grating layer of the sub-wavelength grating device according to embodiments of the invention.

FIG. 27 is an end-on view of a portion of a grating layer of a sub-wavelength grating device according to another embodiment of the invention. In the embodiment of FIG. 27, each of substrates 2252, 2254 introduces a phase shift of π/2 radians (one quarter of the free space wavelength at the center frequency of operation). Thus, light that impinges upon the left portion of sub-pattern 2250 undergoes a phase shift of 2*(π/2) radians or simply, π radians. Light that impinges upon the left portion of sub-pattern 2260 undergoes a phase shift of π/2 radians. These phase shifts are in addition to the phase shift that occurs by way of the scattering caused by sub-patterns 2250, 2260, and 2270. This is to say that if sub-patterns 2250, 2260, and 2270, were affixed to mechanical stability layer 2285 without an intervening substrate, less phase shift would occur.

Figure 28:
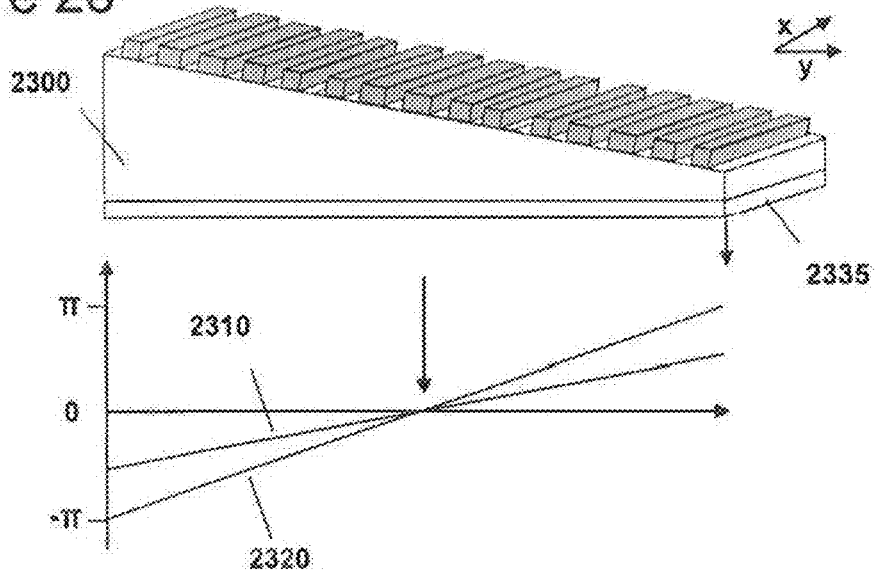

FIG. 28 is a view of a portion of a grating layer of a sub-wavelength grating device according to another embodiment of the invention. In FIG. 28, a grating layer is affixed atop substrate 2300. Substrate 2300, which slopes downward in the y dimension, lies between the grating layer and mechanical stability layer 2335. Thus, light that impinges upon the left side of the grating layer undergoes an additional phase shift given by waveform 2320, shown at the bottom portion of FIG. 28. Waveform 2310 shows the phase shift of the light scattered by the grating layer if substrate 2300 was not present. (That is, if the grating layer were affixed directly to mechanical structure layer 2335.)

Figure 29:
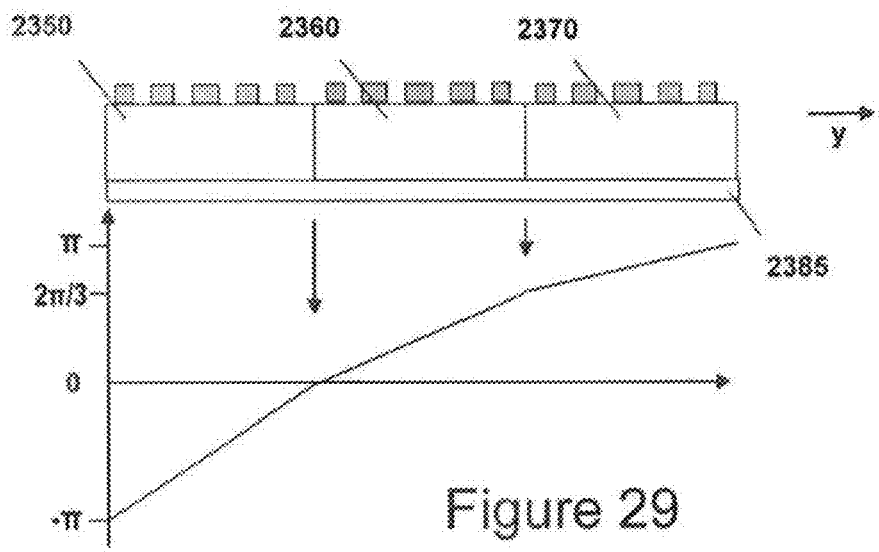

FIG. 29 is an end-on view of a portion of a grating layer of a sub-wavelength grating device according to another embodiment of the invention. In FIG. 29, substrates 2350, 2360, and 2370 each introduce a different phase change based on the index of refraction of each substrate. In the example of FIG. 29, substrate 2350 introduces a phase change of π radians. Substrate 2360 introduces a change of 2π/3 radians, while substrate 2370 introduces a change of π/3 radians. These relative phase changes are shown in the diagram at the lower portion of FIG. 29.

Figure 30:
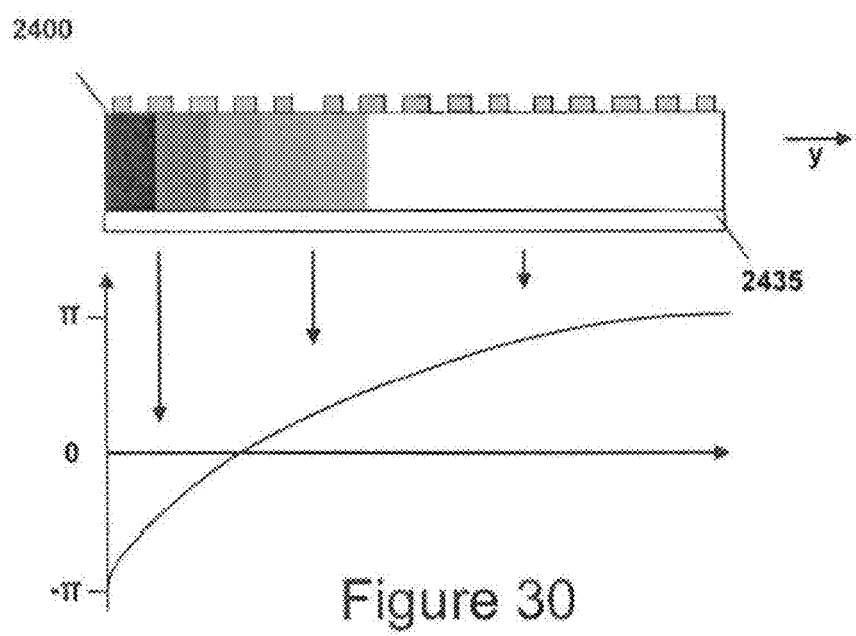

FIG. 30 is an end-on view of a portion of a grating layer of a sub-wavelength grating device according to another embodiment of the invention. In FIG. 30, substrate 2400 includes a material having an index of refraction that discretely or gradually varies in a continuous matter in the y dimension. In this embodiment, the substrate beneath the left-most portion of the grating layer is of a much higher index of refraction than the substrate beneath the right-most portion of the grating layer. Accordingly, light that impinges near the left side of the grating layer could be expected to undergo much larger phase changes than light that impinges on the right side of the grating layer, as shown in the diagram at the lower portion of FIG. 30.

FIG. 31 is a flow chart for a method of fabricating a sub-wavelength grating device according to one or more embodiments of the invention. The method of FIG. 31 begins at step 2450 which includes applying a substrate layer of a predetermined height onto a mechanical support layer. In embodiments of the invention, the height of the substrate applied at step 2450 may correspond to the one-half of the free-space wavelength at a center frequency of operation of the grating device (π radians, such as shown in Figure in 26 herein), or perhaps may correspond to one-quarter of the free-space wavelength at the center frequency of operation of the device (π/2 radians).

The method of FIG. 31 continues at step 2460, which includes changing the index of refraction of the substrate layer applied in step 2450 by way of exposing the substrate to X-ray radiation, exposing the substrate to an electron beam, or by way of implanting ions (perhaps by way of ion diffusion or by way of an ion beam) into the substrate. Step 2460 may also include gradually changing the index of refraction of the substrate in a direction across the substrate, such as might be used to fabricate the device of FIG. 29 or 30 herein. To form the device of embodiments FIG. 29 and some embodiments similar to FIG. 30, the index of refraction of discrete areas of the substrate layer may be modified. To form the device of other embodiments of FIG. 30, the index of refraction may be gradually and continuously varied across the substrate.

The method of FIG. 31 continues at step 2470, which includes removing, at some areas of the substrate, entire portions of the substrate. Step 2470 further includes depositing a dielectric layer having and index of refraction greater than the substrate atop remaining portions of the substrate layer and atop the mechanical support layer. Thus, step 2470 may be employed in order to form the two-stepped grating devices of FIGS. 25 and 26, as well as the multi-stepped grating device of FIG. 27.

The method of FIG. 31 further includes step 2480 in which the top dielectric layer is etched to form a sub-wavelength grating device. The etching of step 2480 may be performed using photolithography, interference lithography, electron beam lithography, or nanoimprint lithography. In embodiments of the invention, the line widths and the periodicity of the lines may be determined as a result of numerical electromagnetics methods such as MEEP or COMSOL Multiphysics® as previously mentioned herein.

In many embodiments of the invention, only one of steps 2460 and 2470 is performed. This is to say that in some embodiments of the invention the index of refraction of the substrate layer is changed or modified by way of exposing the substrate to x-ray radiation, an electron beam, or ion implantation without removing portions of the substrate and depositing a dielectric layer on the substrate and the mechanical support layer, thereby forming a stepped substrate. In other embodiments of the invention, a stepped substrate may be formed without changing the index of refraction of the substrate layer.

In conclusion, while the invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A sub-wavelength grating device having a controlled phase response, comprising:
    a grating layer having line widths, line thicknesses, line periods, and line spacings selected to produce a first level of control in phase changes of different portions of a beam of light incident on the sub-wavelength grating device; and
    a substrate affixed to the grating layer that produces a second level of control in the phase changes of the different portions of the beam of light, the second level of control being accomplished by changing an index of refraction of the substrate in the horizontal dimension, wherein the index of refraction of the substrate is modified in a substantially continuous manner along the horizontal dimension.

2. The sub-wavelength grating device of claim 1, wherein the sub-wavelength grating device is operated as a mirror in which the different portions of the beam of light are reflected from the sub-wavelength grating device.

3. The sub-wavelength greeting device of claim 1, wherein the sub-wavelength grating device is operated as a lens in which the different portions of the beam of light are transmitted through the sub-wavelength grating device.

4. The sub-wavelength grating device of claim 1, wherein the grating layer is composed of a material having a relatively higher index of refraction than the index of refraction of the substrate.

5. A sub-wavelength grating device having a controlled phase response, comprising:
   a grating layer having line widths, line thicknesses, line periods, and line spacings selected to produce a first level of control in phase changes of different portions of a beam of light incident on the sub-wavelength grating device; and
   a substrate affixed to the grating layer that produces a second level of control in the phase changes of the different portions of the beam of light, the second level of control being accomplished by stepping of the substrate in a horizontal dimension across a surface of the substrate, wherein the stepping of the substrate in the horizontal dimension includes a single step.

6. A method for fabricating a sub-wavelength grating device, the method comprising:
   applying a substrate layer of a predetermined height onto a mechanical support layer;
   changing an index of refraction of the substrate layer, wherein the changing the index of refraction of the substrate layer comprises varying the index of refraction of the substrate layer in a direction across the substrate layer to produce phase changes of different portions of a beam of light incident on the sub-wavelength grating device, wherein the changing the index of refraction of the substrate layer uses one of the group consisting of: exposing the substrate layer to x-ray radiation, exposing the substrate layer to an electron beam, and implanting ions in the substrate layer, wherein the changing the index of refraction of the substrate layer introduces gradual changes in the index of refraction of the substrate layer in a direction across the substrate layer;
   depositing a dielectric layer of an index of refraction greater than the index of refraction of the substrate layer atop the substrate layer; and
   etching the dielectric layer to form a grating layer and to form the sub-wavelength grating device, wherein line widths and line period spacings of the grating layer are calculated to produce a further phase changes of different portions of the beam of light.

7. The method claim 6, wherein the etching is performed using one of the group consisting of: photolithography, interference lithography, electron beam lithography, and nanoimprint lithography.

8. The method of claim 6, additionally comprising:
   removing, at some areas of the substrate layer, portions of the substrate layer prior to the depositing the dielectric layer, wherein the dielectric layer is further deposited atop the mechanical support layer, thereby forming a stepped substrate layer.

9. The method of claim 8, wherein the removing further includes:
   removing, at the some areas of the substrate layer, the entire substrate layer thereby exposing the mechanical support layer prior to the depositing the dielectric layer; and
   removing, at other areas of the substrate layer, an amount less than the entire substrate layer, thereby forming first and second steps in the substrate layer.

* * * * *